United States Patent
Zhang et al.

(10) Patent No.: US 12,483,910 B2
(45) Date of Patent: *Nov. 25, 2025

(54) CELL MANAGEMENT METHOD, TRIGGER CONDITION CONFIGURATION METHOD, TERMINAL DEVICE, AND NETWORK-SIDE DEVICE

(71) Applicant: VIVO MOBILE COMMUNICATION CO., LTD., Dongguan (CN)

(72) Inventors: Yanxia Zhang, Dongguan (CN); Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 274 days.

This patent is subject to a terminal disclaimer.

(21) Appl. No.: 18/344,617

(22) Filed: Jun. 29, 2023

(65) Prior Publication Data
US 2023/0354065 A1  Nov. 2, 2023

Related U.S. Application Data

(63) Continuation-in-part of application No. 17/112,627, filed on Dec. 4, 2020, now Pat. No. 11,729,680, (Continued)

(30) Foreign Application Priority Data

Jun. 4, 2018  (CN) .......................... 201810565750.1

(51) Int. Cl.
*H04W 24/02* (2009.01)
*H04W 76/20* (2018.01)

(52) U.S. Cl.
CPC .......... *H04W 24/02* (2013.01); *H04W 76/20* (2018.02)

(58) Field of Classification Search
None
See application file for complete search history.

(56) References Cited

U.S. PATENT DOCUMENTS 6,445,917 B1  9/2002  Bark et al.
2007/0180089 A1  8/2007  Fok et al.
(Continued)

FOREIGN PATENT DOCUMENTS

CN  101375617 A  2/2009
CN  101594632 A  12/2009
(Continued)

OTHER PUBLICATIONS

Extended European Search Report related to Application No. 19814334.9; reported on Jul. 9, 2021.
(Continued)

*Primary Examiner* — Suhail Khan
(74) *Attorney, Agent, or Firm* — von Briesen & Roper, s.c.

(57) ABSTRACT

A cell management method, a trigger condition configuration method, a terminal device, and a network-side device are provided. The method includes: receiving configuration information of a trigger condition and configuration information of a trigger event that are sent by a network-side device, where an association relationship exists between the configuration information of the trigger condition and the configuration information of the trigger event, and configuration information of one trigger condition is associated with configuration information of at least two trigger events; determining, based on the configuration information of the at least two trigger events associated with the configuration information of the trigger condition, whether the trigger (Continued)

condition is satisfied; and when the trigger condition is satisfied, initiating a radio resource control RRC procedure for cell management.

20 Claims, 7 Drawing Sheets

Related U.S. Application Data which is a continuation of application No. PCT/CN2019/088121, filed on May 23, 2019.

(56) References Cited

U.S. PATENT DOCUMENTS

| | | | |
|---|---|---|---|
| 2013/0016613 | A1 | 1/2013 | Huang et al. |
| 2014/0120921 | A1 | 5/2014 | Keskitalo et al. |
| 2014/0126545 | A1 | 5/2014 | Tamura et al. |
| 2015/0312818 | A1 | 10/2015 | Yiu et al. |
| 2016/0127994 | A1 | 5/2016 | Cho et al. |
| 2017/0086087 | A1 | 3/2017 | Kim et al. |
| 2018/0124650 | A1 | 5/2018 | Park et al. |
| 2018/0279181 | A1* | 9/2018 | Hampel ............ H04B 7/0617 |
| 2019/0028938 | A1 | 1/2019 | Park et al. |
| 2020/0045602 | A1 | 2/2020 | Jiang |

FOREIGN PATENT DOCUMENTS

| | | |
|---|---|---|
| CN | 103718604 A | 4/2014 |
| CN | 107113673 A | 8/2017 |
| JP | 2003500909 A | 1/2003 |
| JP | 2017510207 A | 4/2017 |
| KR | 20160128371 A | 11/2016 |
| WO | 2017202463 A1 | 11/2017 |

OTHER PUBLICATIONS

First Japanese Office Action related to Application No. 2020-567910; reported on Jan. 20, 2022.

Second Japanese Office Action related to Application No. 2020-567910; reported on Jun. 9, 2022.

Korean Office Action related to Application No. 10-2020-7038105; reported on Dec. 14, 2021.

United States Non-Final Office Action related to U.S. Appl. No. 17/112,627; reported on Oct. 27, 2022.

First Chinese Office Action related to Application No. 201810565750.1; reported on May 22, 2020.

International Search Report and Written Opinion related to Application No. PCT/CN2019/088121; reported on Aug. 23, 2019.

R2-1703415—Source: Intel Corporation "Analysis of conditional handover", Agenda Item: 10.2.3.2, Document for: Discussion and Decision, 3GPP TSG RAN WG2 Meeting #97 bis, Spokane, USA Apr. 3-7, 2017.

R2-1703428—Source: Intel Corporation "EN-DC procedures and network handling", Agenda Item: 10.2.2.2, Document for: Discussion and Decision, 3GPP TSG-RAN WG2 Meeting #97 bis, Spokane, USA Apr. 3-7, 2017.

R2-1706690—Source: InterDigital Communications "Conditional Reconfiguration for NR", Agenda Item: 10.2.8, Document for: Discussion, Decision, 3GPP TSG-RAN WG2 Ad Hoc, Qingdao, China, Jun. 27-29, 2017.

R2-1707048—Source: Intel Corporation "Inter-RAT measurement for EN DC ", Agenda Item: 10.2.3, Document for: Discussion and Decision, 3GPP TSG-RAN WG2 Meeting Ad Hoc, Qingdao, China, Jun. 27-29, 2017.

R2-1713843—Source: Samsung "Conditional Handover: Event Design Aspects", Agenda Item: 10.2.11, Document for: Discussion/Decision, 3GPP TSG-RAN WG2 Meeting #100, Reno, USA, Nov. 27-Dec. 1, 2017.

* cited by examiner

CELL MANAGEMENT METHOD, TRIGGER CONDITION CONFIGURATION METHOD, TERMINAL DEVICE, AND NETWORK-SIDE DEVICE

CROSS-REFERENCE TO RELATED APPLICATIONS

This application is continuation-in-part of U.S. patent application Ser. No. 17/112,627 filed on Dec. 4, 2020 which is continuation application of PCT International Application No. PCT/CN2019/088121 filed on May 23, 2019, which claims priority to Chinese Patent Application No. 201810565750.1, filed in China on Jun. 4, 2018, the disclosures of which are incorporated in their entireties by reference herein.

TECHNICAL FIELD

This disclosure relates to the field of communications technologies, and in particular, to a cell management method, a trigger condition configuration method, a terminal device, and a network-side device.

BACKGROUND

In a wireless communications system, during communication between user equipment (UE) and a network-side device, the UE in a connected state may move from a coverage area of one base station (a base station to which the UE is currently connected) to a coverage area of another base station due to mobility. In this case, the UE needs to switch from an original radio channel to a new radio channel, that is, complete handover.

A conditional handover mode is being researched for the 5th generation (5G) mobile communications technology to increase a handover probability. Conditional handover means that a base station prepares one or more candidate target cells for the UE beforehand based on a measurement result reported by the UE, and sends a conditional handover command to the UE, where the conditional handover command includes a list of candidate target cells, handover trigger conditions corresponding to the candidate target cells, resource configurations corresponding to the candidate target cells, and the like; and the UE does not perform cell handover immediately after receiving the conditional handover command, but performs cell handover only after determining that a candidate cell satisfies a preset handover trigger condition. Likewise, such conditional cell change mode may also be applied to a procedure such as addition or change or release or modification of a secondary node (SN) that is triggered by mobility of the UE in a dual connectivity (DC) architecture, to further improve flexibility of management of a secondary cell group.

In a condition-triggered cell management (for example, cell handover or cell addition or cell deletion) procedure, a network side needs to configure a trigger condition for the UE, so that the UE autonomously initiates the cell management procedure. However, no related solution is available for configuring a trigger condition in the communications system in the related art.

SUMMARY

Embodiments of this disclosure provide a cell management method, a trigger condition configuration method, a terminal device, and a network-side device to standardize how a trigger condition is configured for a condition-triggered cell management procedure.

According to a first aspect, an embodiment of this disclosure provides a cell management method. The method includes:
  receiving configuration information of a trigger condition and configuration information of a trigger event that are sent by a network-side device, where an association relationship exists between the configuration information of the trigger condition and the configuration information of the trigger event, and configuration information of one trigger condition is associated with configuration information of at least two trigger events;
  determining, based on the configuration information of the at least two trigger events associated with the configuration information of the trigger condition, whether the trigger condition is satisfied; and
  when the trigger condition is satisfied, initiating a radio resource control RRC procedure for cell management.

According to a second aspect, an embodiment of this disclosure further provides a trigger condition configuration method. The method includes:
  obtaining configuration information of a trigger condition and configuration information of a trigger event; and
  sending the configuration information of the trigger condition and the configuration information of the trigger event to a terminal device, where an association relationship exists between the configuration information of the trigger condition and the configuration information of the trigger event, and configuration information of one trigger condition is associated with configuration information of at least two trigger events.

According to a third aspect, an embodiment of this disclosure further provides a terminal device. The terminal device includes:
  a receiving module, configured to receive configuration information of a trigger condition and configuration information of a trigger event that are sent by a network-side device, where an association relationship exists between the configuration information of the trigger condition and the configuration information of the trigger event, and configuration information of one trigger condition is associated with configuration information of at least two trigger events;
  a determining module, configured to determine, based on the configuration information of the at least two trigger events associated with the configuration information of the trigger condition, whether the trigger condition is satisfied; and
  an initiation module, configured to initiate a radio resource control RRC procedure for cell management when the trigger condition is satisfied.

According to a fourth aspect, an embodiment of this disclosure further provides a network-side device. The network-side device includes:
  an obtaining module, configured to obtain configuration information of a trigger condition and configuration information of a trigger event; and
  a sending module, configured to send the configuration information of the trigger condition and the configuration information of the trigger event to a terminal device, where an association relationship exists between the configuration information of the trigger condition and the configuration information of the trigger event, and configuration information of one trigger condition is associated with configuration information of at least two trigger events.

According to a fifth aspect, an embodiment of this disclosure further provides a terminal device, including a processor, a memory, and a computer program stored in the memory and capable of running on the processor, where when the computer program is executed by the processor, steps of the cell management method according to the first aspect are implemented.

According to a sixth aspect, an embodiment of this disclosure further provides a network-side device, including a processor, a memory, and a computer program stored in the memory and capable of running on the processor, where when the computer program is executed by the processor, steps of the trigger condition configuration method according to the second aspect are implemented.

According to a seventh aspect, an embodiment of this disclosure further provides a computer-readable storage medium, where the computer-readable storage medium stores a computer program, and when the computer program is executed by a processor, steps of the cell management method according to the first aspect are implemented, or steps of the trigger condition configuration method according to the second aspect are implemented.

In the embodiments of this disclosure, configuration information of a trigger condition and configuration information of a trigger event that are sent by a network-side device are received, where an association relationship exists between the configuration information of the trigger condition and the configuration information of the trigger event, and configuration information of one trigger condition is associated with configuration information of at least two trigger events; whether the trigger condition is satisfied is determined based on the configuration information of the at least two trigger events associated with the configuration information of the trigger condition; and when the trigger condition is satisfied, a radio resource control RRC procedure for cell management is initiated. This standardizes how a trigger condition is configured for a condition-triggered cell management procedure.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly describes the technical solutions in the embodiments with reference to the accompanying drawings in the embodiments. Apparently, the described embodiments are merely some rather than all of the embodiments of this disclosure. All other embodiments that a person of ordinary skill in the art obtains without creative efforts based on the embodiments of this disclosure shall fall within the protection scope of this disclosure.

The terms "first", "second", and the like in this specification and claims of this application are used to distinguish between similar objects instead of describing a specific order or sequence. It should be understood that numbers used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to such process, method, system, product, or device. In addition, the term "and/or" used in this specification and claims indicates at least one of the connected objects. For example, "A and/or B and/or C" represents the following seven cases: only A, only B, only C, both A and B, both B and C, both A and C, and all A, B, and C.

For ease of understanding, the following describes some terms used in the embodiments of this disclosure.

Conditional Handover:

In the embodiments, a conditional handover procedure may include the following steps.

Step a: A source node sends a handover request (HO Request) to one or more target nodes.

Figure 1:
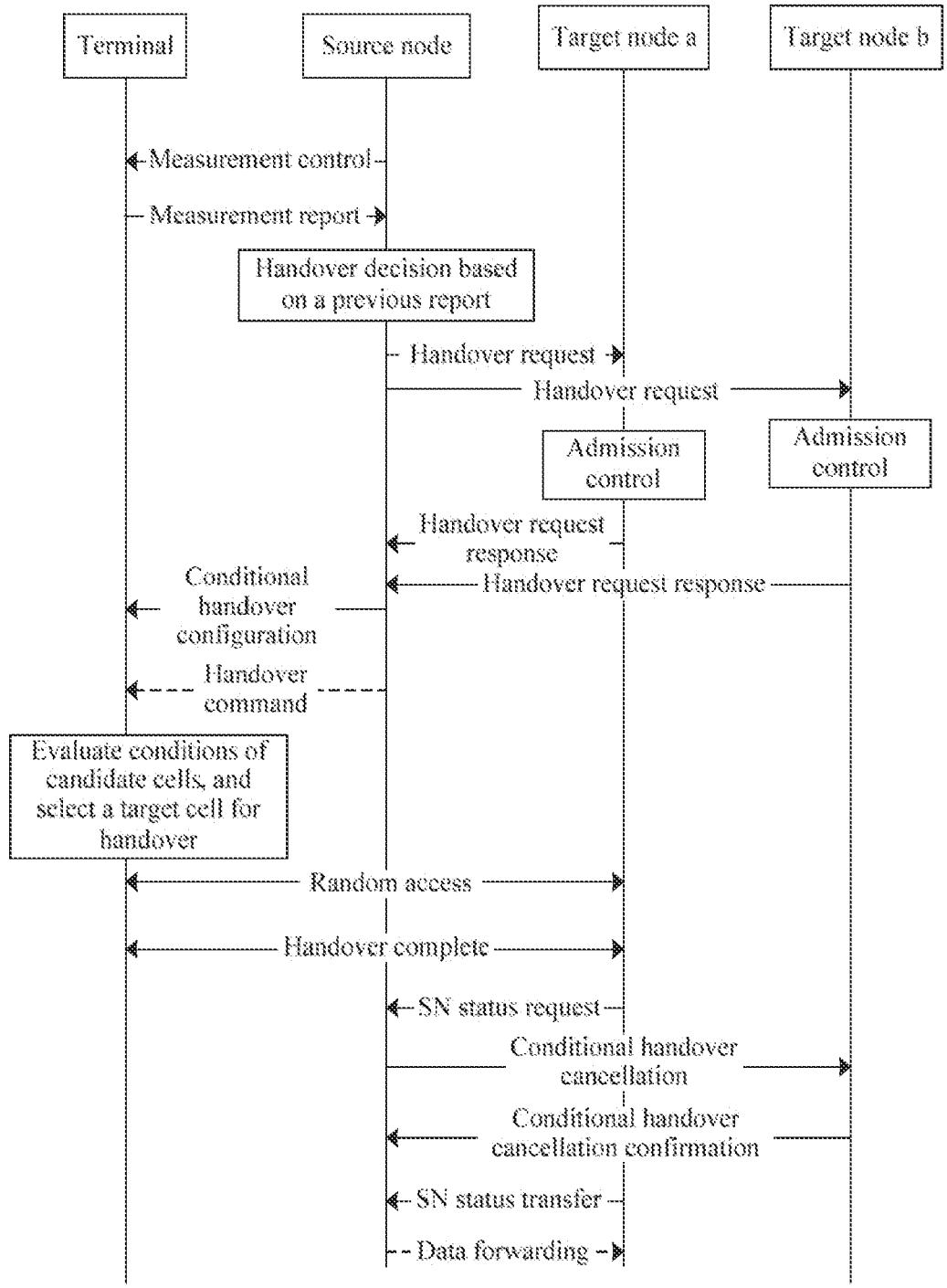
FIG. 1 is a flowchart of a conditional handover procedure according to an embodiment of this disclosure.

For example, in FIG. 1, a source node sends a handover request to a target node a and a target node b.

Step b: The target node feeds back handover acknowledgement information, that is, a handover request response (HO Request ACK), to the source node.

As shown in FIG. 1, the target node a and the target node b send a handover request response to the source node respectively.

Step c: The source node sends configuration information of conditional handover to a terminal.

Step d: The terminal evaluates conditions of candidate cells, and selects a target cell for handover.

In this step, the terminal evaluates whether the conditions of the candidate cells are satisfied, and may select a target cell that satisfies a condition for handover.

As shown in FIG. 1, the terminal may evaluate whether conditions of the target node a and the target node b are satisfied, and when the terminal determines that the condition of the target node a is satisfied, the terminal may initiate a random access procedure to the target node a.

Step e: The terminal initiates a random access procedure in the selected target cell.

As shown in FIG. 1, the terminal selects the target node a to initiate random access.

Step f: The terminal sends handover complete information to the selected target node.

As shown in FIG. 1, the terminal sends handover complete information (that is, HO Complete) to the target node a.

Step g: The source node sends a conditional handover cancellation command to another unselected target node.

As shown in FIG. 1, the source node sends a conditional handover cancellation command (that is, Conditional HO Cancellation) to the target node b.

Step h: The another unselected target node sends a conditional handover cancellation confirmation command to the source node.

As shown in FIG. 1, the target node b sends a conditional handover cancellation command (that is, Conditional HO Cancellation Confirmation) to the source node.

Dual Connectivity:

In a 5th generation (5G) communications system, a dual connectivity (DC) architecture is introduced. The DC architecture may include two cell groups, which are a master cell group (MCG) and a secondary cell group (SCG) respectively. The MCG corresponds to a master node (MN) on a network side, and the SCG corresponds to a secondary node SN) on the network side. In addition, the MCG may include a primary cell (PCell) and one or more secondary cells (SCell), and the secondary cell group may include a primary secondary cell (PSCell) and one or more SCells.

Figure 2:
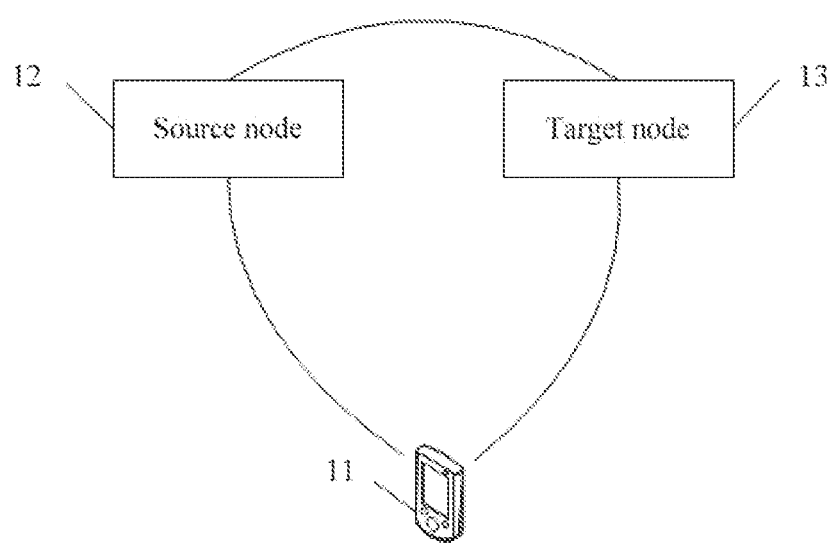
FIG. 2 is a structural diagram of a network system to which an embodiment of this disclosure may be applied.

FIG. 2 is a structural diagram of a network system to which an embodiment of this disclosure may be applied. As shown in FIG. 2, the network system includes a terminal device 11, a source node 12, and a target node 13. The terminal device 11 may also be referred to as user equipment (UE). The terminal device 11 may be a terminal-side device such as a mobile phone, a tablet computer (Tablet Personal Computer), a laptop computer, a personal digital assistant (PDA), a mobile Internet device (MID), a wearable device, or a vehicle-mounted device. It should be noted that a specific type of the terminal device 11 is not limited in this embodiment of this disclosure. The source node 12 may be one of network nodes to which the terminal device 11 is currently connected. For example, if the network nodes to which the terminal device 11 is currently connected include an MN and an SN, the source node 12 may be one of the MN and the SN. The target node 13 may be one of the network nodes to which the terminal device 11 is currently connected, or may be a network node to which the terminal device 11 is currently not connected. Because cell management performed by the terminal device 11 may include but is not limited to at least one of cell handover, cell addition, cell deletion, and cell change in this embodiment of this disclosure, the terminal device 11 may delete a connection between the terminal device 11 and the target node 13 or establish a connection to the target node 13 in a process of performing cell management. The network structure to which the embodiments of this disclosure are applied may include one or more target nodes 13, and one target node 13 is used as an example in the figure.

In addition, in this embodiment of this disclosure, the network node may be a base station in 5G or a later version (for example, a 5G NR NB), or a base station in another communications system, or may be referred to as a NodeB, an evolved NodeB, or an MN, or an SN, or other terms in this field. As long as a same technical effect is achieved, the base station is not limited to a specific technical term.

In addition, this embodiment of this disclosure may be applied to a conditional handover procedure, that is, the source node 12 and the target node 13 may be a source base station and a target base station in the conditional handover procedure; or this embodiment of this disclosure may be applied to a DC architecture, that is, the source node 12 and the target node 13 may be a source SN and a target SN in the DC architecture, or a source MN and a target SN in the DC architecture.

It should be noted that specific functions of the terminal device 11, the source node 12, and the target node 13 in this embodiment of this disclosure are described in detail by using the following embodiments.

Figure 3:
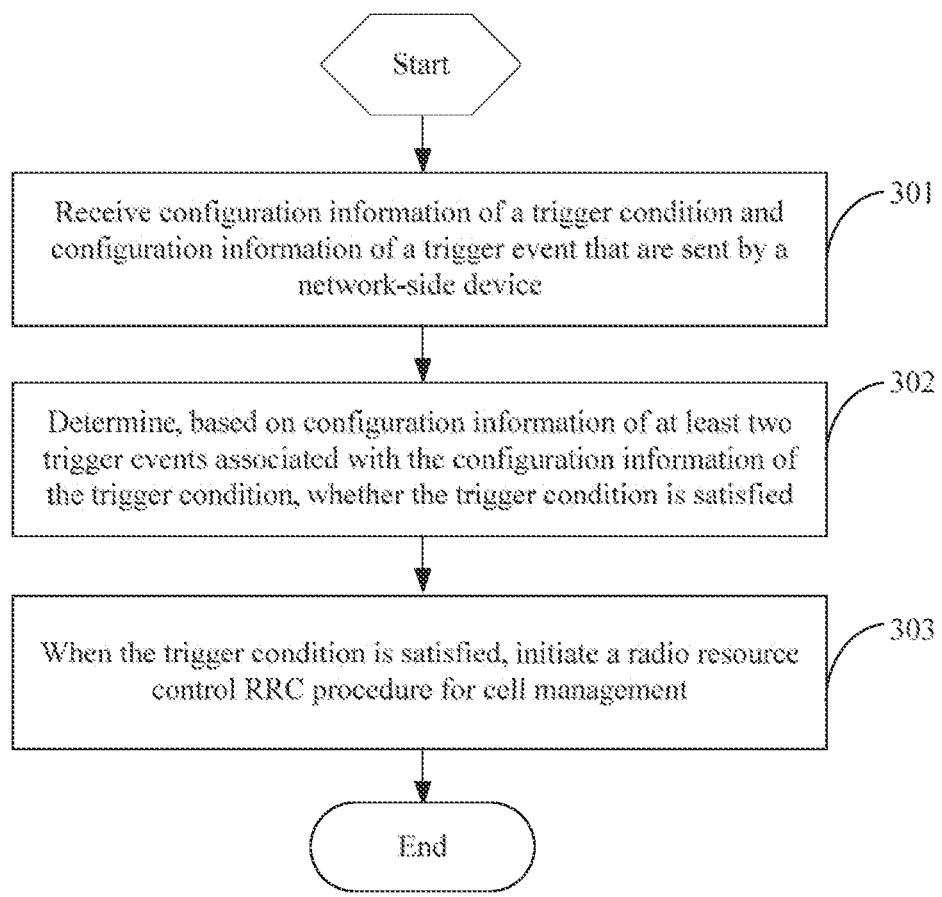
FIG. 3 is a flowchart of a cell management method according to an embodiment of this disclosure.

An embodiment of this disclosure provides a cell management method, applied to a terminal device. FIG. 3 is a flowchart of a cell management method according to an embodiment of this disclosure. As shown in FIG. 3, the method includes the following steps.

Step 301: Receive configuration information of a trigger condition and configuration information of a trigger event that are sent by a network-side device, where an association relationship exists between the configuration information of the trigger condition and the configuration information of the trigger event, and configuration information of one trigger condition is associated with configuration information of at least two trigger events.

In this implementation, the network-side device may send the configuration information of the trigger condition and the configuration information of the trigger event by using a radio resource control (RRC) message. Certainly, the message is not limited in this embodiment of this disclosure. For example, the message may also be another downlink message.

It may be understood that the network-side device may send the configuration information of the trigger condition and the configuration information of the trigger event to the terminal device separately by using different RRC messages, or may send the configuration information of the trigger condition and the configuration information of the trigger event to the terminal device by using a same RRC message.

The configuration information of the trigger condition may include configuration information of one or more trigger conditions, and configuration information of each trigger condition is associated with configuration information of at least two trigger events.

The configuration information of the trigger condition may include but is not limited to effective duration of the trigger condition. The configuration information of the trigger event may include but is not limited to at least one of a type of the trigger event (for example, a trigger event based on a measurement result of a target cell, a trigger event based on a measurement result of a serving cell, or a trigger event based on a packet loss rate in data transmission of a serving cell), a measurement parameter of the trigger event (such as reference signal received power (RSRP), reference signal received quality (RSRQ), a signal to interference plus noise ratio (SINR), or a latency), and a threshold of the trigger event.

Optionally, the receiving configuration information of a trigger condition and configuration information of a trigger event that are sent by a network-side device may include:
  receiving the configuration information of the trigger condition and the configuration information of the trigger event that are sent by a source node; or
  receiving the configuration information of the trigger condition and the configuration information of the trigger event that are sent by a target node through a source node.

In an implementation, the configuration information of the trigger condition and the configuration information of the trigger event may be sent to the terminal device through the source node. Before the source node sends the configuration information of the trigger condition and the configuration information of the trigger event, the source node may determine the configuration information of the trigger condition and the configuration information of the trigger event through negotiation between the source node and one or more target nodes. The negotiation herein may be that the source node and the target node perform signaling interaction to determine the configuration information of the trigger condition and the configuration information of the trigger event.

For example, after receiving configuration information of a target cell of one or more target nodes, the source node associates the configuration information of the trigger condition with the configuration information of the trigger event, and may send the associated configuration information of the trigger condition and configuration information of the trigger event by using an RRC message. It should be noted that one target node may correspond to configuration information of one or more target cells.

Optionally, in some implementations, a conditional handover (CHO) is defined as a handover that is executed by a UE when one or more handover execution conditions are met. The UE starts evaluating the execution condition(s) upon receiving CHO configuration, and stops evaluating the execution condition(s) once a handover is executed (legacy handover or conditional handover execution).

The following principle applies to CHO:

The CHO configuration contains configuration of CHO candidate cell(s) generated by candidate gNB(s) and execution condition(s) generated by a source gNB.

In this implementation, the configuration information of the trigger condition and the configuration information of the trigger event that are sent by the source node are received. Therefore, the terminal device can receive, through the source node, the configuration information of the trigger condition and the configuration information of the trigger event that correspond to one or more target nodes, and transmission overheads can be reduced.

In another implementation, the configuration information of the trigger condition and the configuration information of the trigger event that are sent by the target node to the terminal device through the source node may be received. Before the target node sends the configuration information of the trigger condition and the configuration information of the trigger event, the target node may determine the configuration information of the trigger condition and the configuration information of the trigger event through negotiation between the target node and the source node.

For example, after receiving one or more pieces of request information that are sent by the source node for condition-triggered cell management, the target node may associate the configuration information of the trigger condition with the configuration information of the trigger event, and send the associated configuration information of the trigger condition and configuration information of the trigger event to the source node, and the source node sends the configuration information of the trigger condition and the configuration information of the trigger event to the terminal device.

In this implementation, the configuration information of the trigger condition and the configuration information of the trigger event that are sent by the target node through the source node are received. Therefore, the configuration information of the trigger condition and the configuration information of the trigger event can be delivered by the target node. The configuration information of the trigger condition and the configuration information of the trigger event may be transparent to the source node, and merely need to be forwarded or transmitted transparently. Therefore, complexity of the source node can be reduced, and power consumption of the source node can be reduced.

It should be noted that the source node and the target node may be a source base station and a target base station respectively in a cell handover procedure, or a source SN and a target SN in DC, or a source MN and a target SN in DC, or the like. This is not limited in this embodiment of this disclosure.

Step 302: Determine, based on the configuration information of the at least two trigger events associated with the configuration information of the trigger condition, whether the trigger condition is satisfied.

In this implementation, because an association relationship exists between the configuration information of the trigger condition and the configuration information of the trigger event, and configuration information of one trigger condition is associated with configuration information of at least two trigger events, the terminal device may evaluate, based on a network-side configuration, the configuration information of the at least two trigger events associated with the configuration information of the trigger condition, to determine whether the trigger condition is satisfied.

For example, when configuration information of any trigger event in the configuration information of the at least two trigger events associated with the configuration information of the trigger condition is satisfied, the terminal device determines that the trigger condition is satisfied; or when configuration information of all trigger events in the configuration information of the at least two trigger events associated with the configuration information of the trigger condition is satisfied, the terminal device determines that the trigger condition is satisfied.

For example, configuration information of at least two trigger events associated with configuration information of a trigger condition P includes configuration information a of a trigger event and configuration information b of a trigger event, where a type of the trigger event in the configuration information a of the trigger event is that a measurement result of a target cell is greater than or equal to a threshold a and a measurement parameter of the trigger event is RSRP; and a type of the trigger event in the configuration information b of the trigger event is that a measurement result of a serving cell is less than or equal to a threshold b and a measurement parameter of the trigger event is RSRP. In this case, when either of the configuration information a of the trigger event and the configuration information b of the trigger event is satisfied, the terminal device may determine that the trigger condition P is satisfied, or when the configuration information a of the trigger event and the configuration information b of the trigger event are both satisfied, the terminal device may determine that the trigger condition P is satisfied.

For example, the configuration information of the trigger event may be stored in a trigger event information list, each entry in the trigger event information list includes configuration information of a trigger event and identification information corresponding to the configuration information of the trigger event. The identification information in the trigger event information list may be measurement identification (MeasID), and if event(s) associated to all measId(s) within conditional trigger configuration (condTriggerConfig) for a target candidate cell within the stored cell configuration (condRRCReconfig) are fulfilled, then the target candidate cell within the stored condRRCReconfig, associated to that conditional reconfiguration identification (condReconfigId), is considered as a triggered cell, or, the conditional reconfiguration execution is initiated.

Step 303: When the trigger condition is satisfied, initiate a radio resource control RRC procedure for cell management.

In this implementation, the cell management may include cell handover in conditional handover, or SN addition, change, release, or modification triggered by an MN in a DC architecture, or SN addition, change, release, or modification triggered by an SN in a DC architecture, or the like.

In this embodiment of this disclosure, when the trigger condition is satisfied, the radio resource control (RRC) procedure is initiated to further perform a cell management procedure.

In the cell management method in this embodiment of this disclosure, configuration information of a trigger condition and configuration information of a trigger event that are sent by a network-side device are received, where an association relationship exists between the configuration information of the trigger condition and the configuration information of the trigger event, and configuration information of one trigger condition is associated with configuration information of at least two trigger events; whether the trigger condition is satisfied is determined based on the configuration information of the at least two trigger events associated with the configuration information of the trigger condition; and when the trigger condition is satisfied, a radio resource control RRC procedure for cell management is initiated. This standardizes how a trigger condition is configured for a condition-triggered cell management procedure. In addition, the trigger condition is evaluated based on the configuration information of the at least two trigger events associated with the configuration information of the trigger condition, so that a decision result can be more accurate.

Optionally, the configuration information of the trigger condition is stored in a trigger condition information list, the configuration information of the trigger event is stored in a trigger event information list, and the association relationship is stored in an association relationship list; or the configuration information of the trigger condition and the configuration information of the trigger event are stored in a trigger condition configuration information list, where each entry in the trigger condition configuration information list includes configuration information of a trigger condition and configuration information of at least two trigger events corresponding to the configuration information of the trigger condition.

In some implementations, the trigger condition configuration information list may be CondReconfigToAddModList, the configuration information of the trigger event may be condExecutionCond, each entry in the trigger condition configuration information list may be equivalent to CondReconfigToAddMod, and each entry in the trigger condition configuration information list may include configuration information of a trigger condition and configuration information of at least two trigger events corresponding to the configuration information of the trigger condition. The configuration information of the trigger condition may be equivalent to condReconfigId, and association with the corresponding configuration information of at least two trigger events may be implemented via condExecutionCond.

In an implementation, the configuration information of the trigger condition, the configuration information of the trigger event, and the association relationship between the configuration information of the trigger condition and the configuration information of the trigger event are separately stored in different lists. Each entry in the trigger condition information list may include configuration information of one trigger condition, each entry in the trigger event information list may include configuration information of one trigger event, and each entry in the association relationship list may include one association relationship.

It may be understood that because configuration information of one trigger condition is associated with configuration information of at least two trigger events in this embodiment of this disclosure, an association relationship includes an association relationship between configuration information of one trigger condition and configuration information of at least two trigger events. To be specific, each entry in the association relationship list includes an association relationship between configuration information of one trigger condition and configuration information of at least two trigger events.

Optionally, each entry in the trigger condition information list may include configuration information of a trigger condition and identification information corresponding to the configuration information of the trigger condition; and each entry in the trigger event information list may include configuration information of a trigger event and identification information corresponding to the configuration information of the trigger event.

In this implementation, each entry in the trigger condition information list may include identification information in addition to configuration information of a trigger condition. For example, each entry in the trigger condition information list includes configuration information of a trigger condition and identification information (such as a condition ID) corresponding to the configuration information of the trigger condition. Therefore, the configuration information of the trigger condition may be identified by using the identification information corresponding to the configuration information of the trigger condition, or the configuration information of the trigger condition and the configuration information of the trigger event are associated by using the identification information.

Likewise, each entry in the trigger event information list may include identification information in addition to configuration information of a trigger event. For example, each entry in the trigger event information list includes configuration information of a trigger event and identification information (such as an event ID) corresponding to the configuration information of the trigger event. Therefore, the configuration information of the trigger event may be identified by using the identification information corresponding to the configuration information of the trigger event, or the configuration information of the trigger event and the configuration information of the trigger condition are associated by using the identification information.

Optionally, the association relationship may include:
an association relationship between identification information corresponding to configuration information of a trigger condition and an entry tag of the trigger event information list; or
an association relationship between an entry tag of the trigger condition information list and identification information corresponding to configuration information of a trigger event; or
an association relationship between an entry tag of the trigger condition information list and an entry tag of the trigger event information list; or
an association relationship between identification information corresponding to configuration information of a trigger condition and identification information in the trigger event information list; or an association relationship between an entry tag of the trigger condition information list and identification information in the trigger event information list.

In some implementations, the association relationship between the identification information corresponding to the configuration information of the trigger condition and the identification information in the trigger event information list may include:

an association relationship between the identification information corresponding to the configuration information of the trigger condition and identification information corresponding to configuration information of a trigger event.

The identification information in the trigger event information list may be measurement identification (MeasID), or target terminal identification, or event identification, etc.

In this implementation, an entry tag may be an entry in a list. For example, a first entry in the list is a tag 1, and a second entry in the list is a tag 2.

It may be understood that, since configuration information of one trigger condition is associated with configuration information of at least two trigger events in the embodiments of this disclosure, an association relationship between identification information corresponding to configuration information of a trigger condition and identification information corresponding to configuration information of a trigger event includes at least: an association relationship between identification information corresponding to configuration information of one trigger condition and identification information corresponding to configuration information of at least two trigger events.

It may be understood that because configuration information of one trigger condition is associated with configuration information of at least two trigger events in this embodiment of this disclosure, an association relationship between identification information corresponding to configuration information of a trigger condition and an entry tag of the trigger event information list includes at least an association relationship between identification information corresponding to configuration information of one trigger condition and at least two entry tags of the trigger event information list; an association relationship between an entry tag of the trigger condition information list and identification information corresponding to configuration information of a trigger event includes at least an association relationship between one entry tag of the trigger condition information list and identification information corresponding to configuration information of at least two trigger events; and an association relationship between an entry tag of the trigger condition information list and an entry tag of the trigger event information list includes at least an association relationship between one entry tag of the trigger condition information list and at least two entry tags of the trigger event information list.

By using a plurality of association relationships provided in this embodiment of this disclosure, configuration information of a trigger condition may be flexibly associated with configuration information of a trigger event, so that flexibility is improved.

In another implementation, the configuration information of the trigger condition and the configuration information of the trigger event may be correspondingly stored in a same list. Each entry in the trigger condition configuration information list includes configuration information of a trigger condition and configuration information of at least two trigger events corresponding to the configuration information of the trigger condition. Therefore, configuration information of a trigger condition can be associated with configuration information of a trigger event by using one list, a more flexible configuration of an association between configuration information of a trigger condition and configuration information of a trigger event can be implemented, and signaling transmission overheads can be reduced.

Optionally, the configuration information of the trigger event includes at least one of the following: the type of the trigger event, the measurement parameter of the trigger event, the threshold of the trigger event, a trigger type, and trigger duration.

In this implementation, the type of the trigger event, the measurement parameter of the trigger event, the threshold of the trigger event, the trigger type, the trigger duration, and the like may be all determined through negotiation between the source node and the target node.

Optionally, the type of the trigger event may include but is not limited to any one of the following:

a first trigger event based on a measurement result of a target cell;

a second trigger event based on a measurement result of a serving cell;

a third trigger event based on a measurement result of a target cell and a measurement result of a serving cell;

a fourth trigger event based on a packet loss rate in data transmission of a serving cell; and a fifth trigger event based on a latency in data transmission of a serving cell.

In this implementation, the trigger event based on the measurement result of the target cell (that is, the first trigger event) may be a trigger event that the measurement result of the target cell satisfies a condition. For example, the measurement result of the target cell is greater than or equal to a first threshold.

The trigger event based on the measurement result of the serving cell (that is, the second trigger event) may be a trigger event that the measurement result of the serving cell satisfies a condition. For example, the measurement result of the serving cell is less than or equal to a second threshold.

The trigger event based on the measurement result of the target cell and the measurement result of the serving cell (that is, the third trigger event) may be a trigger event that the measurement result of the target cell and the measurement result of the serving cell satisfy a condition. For example, a difference between the measurement result of the target cell and the measurement result of the serving cell is greater than or equal to a third threshold; or the measurement result of the target cell is greater than or equal to a fourth threshold, and the measurement result of the serving cell is less than or equal to a fifth threshold.

The trigger event based on the packet loss rate in data transmission of the serving cell (that is, the fourth trigger event) may indicate that the packet loss rate in data transmission of the serving cell satisfies a condition. For example, the packet loss rate in data transmission of the serving cell is greater than or equal to a sixth threshold.

The trigger event based on the latency in data transmission of the serving cell (that is, the fifth trigger event) may indicate that the latency in data transmission of the serving cell satisfies a condition. For example, the latency in data transmission of the serving cell is greater than or equal to a seventh threshold.

It may be understood that the first threshold, the second threshold, the third threshold, the fourth threshold, the fifth threshold, the sixth threshold, and the seventh threshold are thresholds of the trigger event configured in the configuration information of the trigger event.

The measurement parameter of the trigger event may include but is not limited to RSRP, RSRQ, SINR, or latency. The trigger type may include event trigger or periodic trigger, or the like. The trigger duration is used to indicate that it is considered that a trigger event has occurred only after duration of the trigger event reaches the trigger duration. For example, it is considered that the trigger event has occurred only when the measurement result of the target cell is greater than or equal to the threshold for duration of 5 ms.

It may be understood that the configuration information of the trigger event may describe the trigger event. For example, the type of the trigger event in the configuration information of the trigger event is that the measurement result of the target cell is greater than or equal to the threshold, the measurement parameter of the trigger event is RSRP, and the threshold of the trigger event is a. In this case, the trigger event described by the configuration information of the trigger event may be that a measurement result of RSRP of the target cell is greater than or equal to a. Therefore, when an evaluated measurement result of the RSRP of the target cell is greater than or equal to a, it is determined that the trigger event has occurred.

Optionally, the configuration information of the trigger condition includes the effective duration of the trigger condition.

In this implementation, the effective duration of the trigger condition is used to indicate that the trigger condition is effective in the effective duration, and is not effective beyond the effective duration.

Optionally, the determining, based on the configuration information of the at least two trigger events associated with the configuration information of the trigger condition, whether the trigger condition is satisfied includes:
  when configuration information of any trigger event in the configuration information of the at least two trigger events associated with the configuration information of the trigger condition is satisfied, determining that the trigger condition is satisfied; or
  when configuration information of N trigger events in the configuration information of the at least two trigger events associated with the configuration information of the trigger condition is satisfied, determining that the trigger condition is satisfied, where N is an integer greater than 1; or
  when configuration information of all trigger events in the configuration information of the at least two trigger events associated with the configuration information of the trigger condition is satisfied, determining that the trigger condition is satisfied.

In this implementation, a value of N may be predefined by a protocol or configured by the network-side device. Specifically, when the value of N is configured by the network side, the network-side device may send the configuration information of the trigger condition and the configuration information of the trigger event together to the terminal device.

This embodiment of this disclosure provides a plurality of manners of determining, based on the configuration information of the at least two trigger events associated with the configuration information of the trigger condition, whether the trigger condition is satisfied. Therefore, flexibility of evaluating the trigger condition can be improved, and accuracy of the decision result can also be improved.

Figure 4:
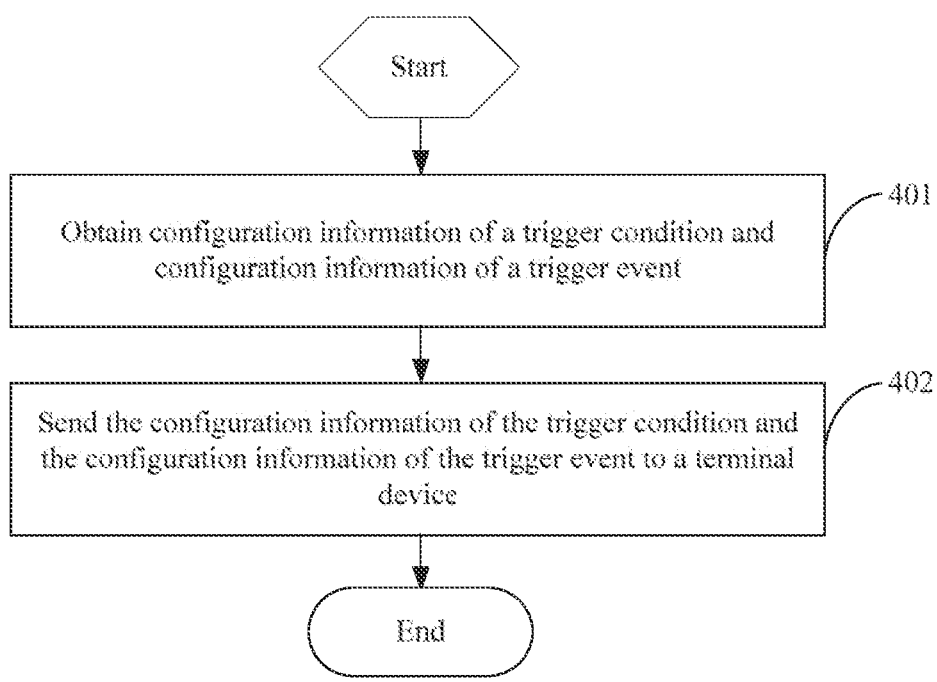
FIG. 4 is a flowchart of a trigger condition configuration method according to an embodiment of this disclosure.

An embodiment of this disclosure further provides a trigger condition configuration method, applied to a source node or a target node. FIG. 4 is a flowchart of a trigger condition configuration method according to an embodiment of this disclosure. As shown in FIG. 4, the method includes the following steps.

Step 401: Obtain configuration information of a trigger condition and configuration information of a trigger event.

In this embodiment of this disclosure, the configuration information of the trigger condition may include but is not limited to effective duration of the trigger condition. The configuration information of the trigger event may include but is not limited to at least one of a type of the trigger event (for example, a trigger event based on a measurement result of a target cell, a trigger event based on a measurement result of a serving cell, or a trigger event based on a packet loss rate in data transmission of a serving cell), a measurement parameter of the trigger event (such as reference signal received power (RSRP), reference signal received quality (RSRQ), a signal to interference plus noise ratio (SINR), or a latency), and a threshold of the trigger event.

Optionally, the configuration information of the trigger condition and the configuration information of the trigger event may be determined through negotiation between the target node and the source node.

Specifically, when the method is applied to the source node, the source node may negotiate with one or more target nodes to determine the configuration information of the trigger condition and the configuration information of the trigger event. When the method is applied to the target node, the target node may negotiate with the source node to determine the configuration information of the trigger condition and the configuration information of the trigger event.

Step 402: Send the configuration information of the trigger condition and the configuration information of the trigger event to a terminal device, where an association relationship exists between the configuration information of the trigger condition and the configuration information of the trigger event, and configuration information of one trigger condition is associated with configuration information of at least two trigger events.

In this implementation, the configuration information of the trigger condition and the configuration information of the trigger event may be sent by using an RRC message. Certainly, the message is not limited in this embodiment of this disclosure. For example, the message may also be another downlink message.

It may be understood that a network-side device (such as the target node or the source node) may send the configuration information of the trigger condition and the configuration information of the trigger event to the terminal device separately by using different RRC messages, or may send the configuration information of the trigger condition and the configuration information of the trigger event to the terminal device by using a same RRC message.

The configuration information of the trigger condition may include configuration information of one or more trigger conditions, and configuration information of each trigger condition is associated with configuration information of at least two trigger events.

Optionally, when the method is applied to the source node, the sending the configuration information of the trigger condition and the configuration information of the trigger event to a terminal device includes:
  when receiving configuration information of a target cell that is sent by the target node, sending the configuration information of the trigger condition and the configuration information of the trigger event to the terminal device; or when receiving the configuration information of the trigger condition and the configuration information of the trigger event that are sent by the target node, sending the configuration information of the trigger condition and the configuration information of the trigger event to the terminal device.

In this implementation, the configuration information of the trigger condition and the configuration information of the trigger event may be sent to the terminal device through the source node. For example, when receiving the configuration information of the target cell that is sent by the target node, the source node may associate the configuration information of the trigger condition with the configuration information of the trigger event, and send the associated configuration information of the trigger condition and configuration information of the trigger event to the terminal device. In addition, after receiving the configuration information of the trigger condition and the configuration information of the trigger event that are sent by the target node, the source node may also send, to the terminal device, the configuration information of the trigger condition and the configuration information of the trigger event that are sent by the target node and received by the source node.

Optionally, when the method is applied to the target node, the sending the configuration information of the trigger condition and the configuration information of the trigger event to a terminal device includes:

when receiving request information that is sent by the source node for condition-triggered cell management, sending the configuration information of the trigger condition and the configuration information of the trigger event to the terminal device through the source node.

In this implementation, the configuration information of the trigger condition and the configuration information of the trigger event that are sent by the target node to the terminal device through the source node may be received. For example, when receiving the request information that is sent by the source node for cell management triggered based on the condition, the target node may associate the configuration information of the trigger condition with the configuration information of the trigger event, and send the associated configuration information of the trigger condition and configuration information of the trigger event to the source node, so that the associated configuration information of the trigger condition and configuration information of the trigger event are sent to the terminal device through the source node.

Optionally, in some implementations, a conditional handover (CHO) is defined as a handover that is executed by a UE when one or more handover execution conditions are met. The UE starts evaluating the execution condition(s) upon receiving CHO configuration, and stops evaluating the execution condition(s) once a handover is executed (legacy handover or conditional handover execution).

The following principle applies to CHO:

The CHO configuration contains configuration of CHO candidate cell(s) generated by candidate gNB(s) and execution condition(s) generated by a source gNB.

It should be noted that the source node and the target node may be a source base station and a target base station respectively in a cell handover procedure, or a source SN and a target SN in DC, or a source MN and a target SN in DC, or the like. This is not limited in this embodiment of this disclosure.

The cell management may include cell handover in conditional handover, or SN addition, change, release, or modification triggered by an MN in a DC architecture, or SN addition, change, release, or modification triggered by an SN in a DC architecture, or the like.

For example, the configuration information of the trigger event may be stored in a trigger event information list, each entry in the trigger event information list includes configuration information of a trigger event and identification information corresponding to the configuration information of the trigger event. The identification information in the trigger event information list may be measurement identification (MeasID), and if event(s) associated to all measId(s) within conditional trigger configuration (condTriggerConfig) for a target candidate cell within the stored cell configuration (condRRCReconfig) are fulfilled, then the target candidate cell within the stored condRRCReconfig, associated to that conditional reconfiguration identification (condReconfigId), is considered as a triggered cell, or, the conditional reconfiguration execution is initiated.

In the trigger condition configuration method in this embodiment of this disclosure, configuration information of a trigger condition and configuration information of a trigger event are obtained, and the configuration information of the trigger condition and the configuration information of the trigger event are sent to a terminal device, where an association relationship exists between the configuration information of the trigger condition and the configuration information of the trigger event, and configuration information of one trigger condition is associated with configuration information of at least two trigger events. Therefore, the terminal device may evaluate the trigger condition based on the configuration information of the at least two trigger events associated with the configuration information of the trigger condition, to decide whether to initiate an RRC procedure for cell management. This not only standardizes how a trigger condition is configured for a condition-triggered cell management procedure, but also makes a decision result more accurate.

Optionally, the configuration information of the trigger condition is stored in a trigger condition information list, the configuration information of the trigger event is stored in a trigger event information list, and the association relationship is stored in an association relationship list; or the configuration information of the trigger condition and the configuration information of the trigger event are stored in a trigger condition configuration information list, where each entry in the trigger condition configuration information list includes configuration information of a trigger condition and configuration information of at least two trigger events corresponding to the configuration information of the trigger condition.

In some implementations, the trigger condition configuration information list may be CondReconfigToAddModList, the configuration information of the trigger event may be condExecutionCond, each entry in the trigger condition configuration information list may be equivalent to CondReconfigToAddMod, and each entry in the trigger condition configuration information list may include configuration information of a trigger condition and configuration information of at least two trigger events corresponding to the configuration information of the trigger condition. The configuration information of the trigger condition may be equivalent to condReconfigId, and association with the corresponding configuration information of at least two trigger events may be implemented via condExecutionCond.

In an implementation, the configuration information of the trigger condition, the configuration information of the trigger event, and the association relationship between the configuration information of the trigger condition and the configuration information of the trigger event are separately stored in different lists. Each entry in the trigger condition information list may include configuration information of one trigger condition, each entry in the trigger event information list may include configuration information of one trigger event, and each entry in the association relationship list may include one association relationship.

It may be understood that because configuration information of one trigger condition is associated with configuration information of at least two trigger events in this embodiment of this disclosure, an association relationship includes an association relationship between configuration information of one trigger condition and configuration information of at least two trigger events. To be specific, each entry in the association relationship list includes an association relationship between configuration information of one trigger condition and configuration information of at least two trigger events.

Optionally, each entry in the trigger condition information list includes configuration information of a trigger condition and identification information corresponding to the configuration information of the trigger condition; and each entry in the trigger event information list includes configuration information of a trigger event and identification information corresponding to the configuration information of the trigger event.

In this implementation, each entry in the trigger condition information list may include identification information in addition to configuration information of a trigger condition. For example, each entry in the trigger condition information list includes configuration information of a trigger condition and identification information (such as a condition ID) corresponding to the configuration information of the trigger condition. Therefore, the configuration information of the trigger condition may be identified by using the identification information corresponding to the configuration information of the trigger condition, or the configuration information of the trigger condition and the configuration information of the trigger event are associated by using the identification information.

Likewise, each entry in the trigger event information list may include identification information in addition to configuration information of a trigger event. For example, each entry in the trigger event information list includes configuration information of a trigger event and identification information (such as an event ID) corresponding to the configuration information of the trigger event. Therefore, the configuration information of the trigger event may be identified by using the identification information corresponding to the configuration information of the trigger event, or the configuration information of the trigger event and the configuration information of the trigger condition are associated by using the identification information.

Optionally, the association relationship includes:
an association relationship between identification information corresponding to configuration information of a trigger condition and an entry tag of the trigger event information list; or
an association relationship between an entry tag of the trigger condition information list and identification information corresponding to configuration information of a trigger event; or
an association relationship between an entry tag of the trigger condition information list and an entry tag of the trigger event information list; or
an association relationship between identification information corresponding to configuration information of a trigger condition and identification information in the trigger event information list; or
an association relationship between an entry tag of the trigger condition information list and identification information in the trigger event information list.

In some implementations, the association relationship between the identification information corresponding to the configuration information of the trigger condition and the identification information in the trigger event information list may include:
an association relationship between the identification information corresponding to the configuration information of the trigger condition and identification information corresponding to configuration information of a trigger event.

The identification information in the trigger event information list may be measurement identification (MeasID), or target terminal identification, or event identification, etc.

In this implementation, an entry tag may be an entry in a list. For example, a first entry in the list is a tag 1, and a second entry in the list is a tag 2.

By using a plurality of association relationships provided in this embodiment of this disclosure, configuration information of a trigger condition may be flexibly associated with configuration information of a trigger event, so that flexibility is improved.

In another implementation, the configuration information of the trigger condition and the configuration information of the trigger event may be correspondingly stored in a same list. Each entry in the trigger condition configuration information list includes configuration information of a trigger condition and configuration information of at least two trigger events corresponding to the configuration information of the trigger condition. Therefore, configuration information of a trigger condition can be associated with configuration information of a trigger event by using one list, a more flexible configuration of an association between configuration information of a trigger condition and configuration information of a trigger event can be implemented, and signaling transmission overheads can be reduced.

Optionally, the configuration information of the trigger event includes at least one of the following: the type of the trigger event, the measurement parameter of the trigger event, the threshold of the trigger event, a trigger type, and trigger duration.

In this implementation, the type of the trigger event, the measurement parameter of the trigger event, the threshold of the trigger event, the trigger type, the trigger duration, and the like may be all determined through negotiation between the source node and the target node.

Optionally, the type of the trigger event includes any one of the following:
a first trigger event based on a measurement result of a target cell;
a second trigger event based on a measurement result of a serving cell;
a third trigger event based on a measurement result of a target cell and a measurement result of a serving cell;
a fourth trigger event based on a packet loss rate in data transmission of a serving cell; and
a fifth trigger event based on a latency in data transmission of a serving cell.

In this implementation, the trigger event based on the measurement result of the target cell (that is, the first trigger event) may be a trigger event that the measurement result of the target cell satisfies a condition. For example, the measurement result of the target cell is greater than or equal to a first threshold.

The trigger event based on the measurement result of the serving cell (that is, the second trigger event) may be a trigger event that the measurement result of the serving cell satisfies a condition. For example, the measurement result of the serving cell is less than or equal to a second threshold.

The trigger event based on the measurement result of the target cell and the measurement result of the serving cell (that is, the third trigger event) may be a trigger event that the measurement result of the target cell and the measurement result of the serving cell satisfy a condition. For example, a difference between the measurement result of the target cell and the measurement result of the serving cell is greater than or equal to a third threshold; or the measurement result of the target cell is greater than or equal to a fourth threshold, and the measurement result of the serving cell is less than or equal to a fifth threshold.

The trigger event based on the packet loss rate in data transmission of the serving cell (that is, the fourth trigger event) may indicate that the packet loss rate in data transmission of the serving cell satisfies a condition. For example, the packet loss rate in data transmission of the serving cell is greater than or equal to a sixth threshold.

The trigger event based on the latency in data transmission of the serving cell (that is, the fifth trigger event) may indicate that the latency in data transmission of the serving cell satisfies a condition. For example, the latency in data transmission of the serving cell is greater than or equal to a seventh threshold.

It may be understood that the first threshold, the second threshold, the third threshold, the fourth threshold, the fifth threshold, the sixth threshold, and the seventh threshold are thresholds of the trigger event configured in the configuration information of the trigger event.

The measurement parameter of the trigger event may include but is not limited to RSRP, RSRQ, SINR, or latency. The trigger type may include event trigger or periodic trigger, or the like. The trigger duration is used to indicate that it is considered that a trigger event has occurred only after duration of the trigger event reaches the trigger duration. For example, it is considered that the trigger event has occurred only when the measurement result of the target cell is greater than or equal to the threshold for duration of 5 ms.

It may be understood that the configuration information of the trigger event may describe the trigger event. For example, the type of the trigger event in the configuration information of the trigger event is that the measurement result of the target cell is greater than or equal to the threshold, the measurement parameter of the trigger event is RSRP, and the threshold of the trigger event is a. In this case, the trigger event described by the configuration information of the trigger event may be that a measurement result of RSRP of the target cell is greater than or equal to a. Therefore, when an evaluated measurement result of the RSRP of the target cell is greater than or equal to a, it is determined that the trigger event has occurred.

Figure 5:
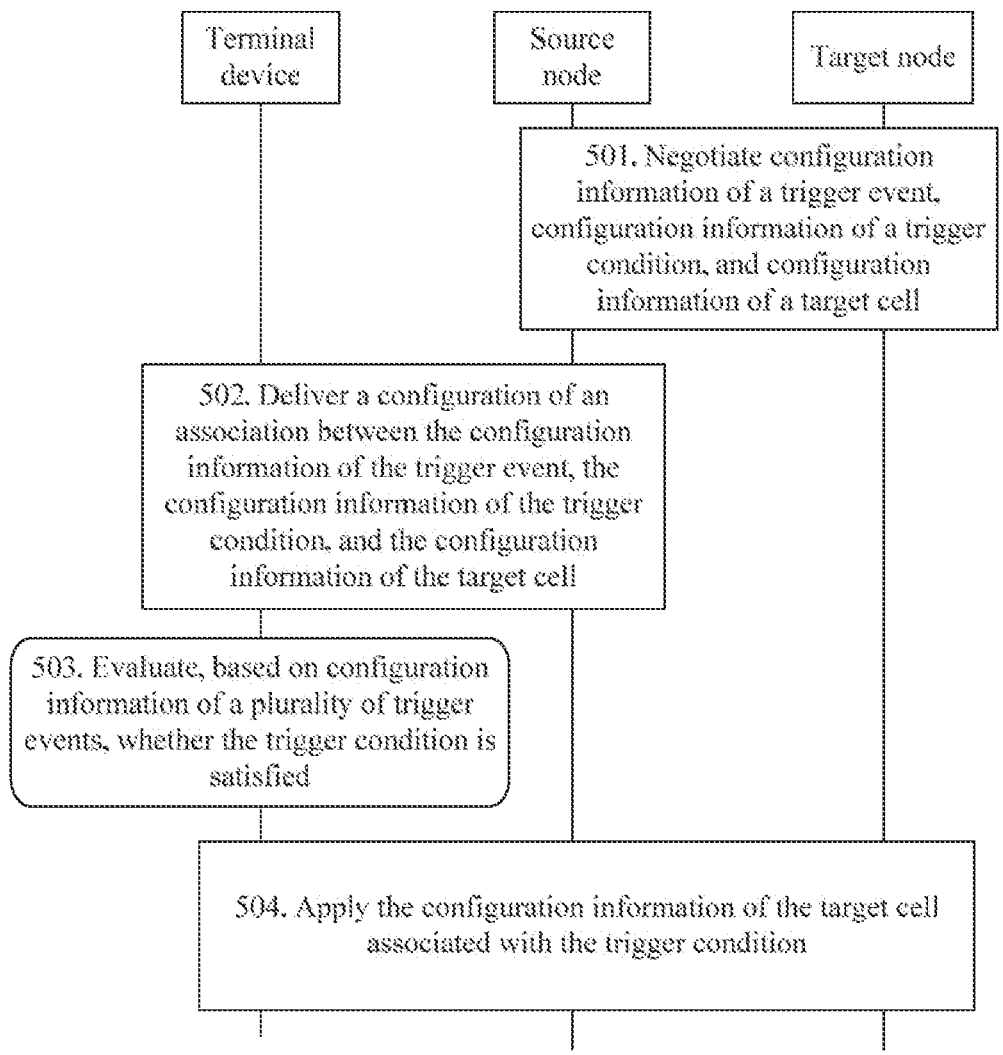
FIG. 5 is a flowchart of a cell management method according to another embodiment of this disclosure.

FIG. 5 is a schematic diagram of a cell management method according to another embodiment of this disclosure. A source node and a target node in FIG. 5 may be a source base station and a target base station in a handover procedure, or a source SN and a target SN in DC, or a source MN and a target SN in DC. As shown in FIG. 5, the method includes the following steps.

Step 501: A source node and a target node negotiate configuration information of a trigger condition, configuration information of a trigger event, and configuration information of a target cell for conditional cell management.

The configuration information of the trigger event may include but is not limited to:
  a type of the trigger event;
  a measurement parameter of the trigger event, for example, RSRP, RSRQ, SINR, or latency;
  a threshold of the trigger event;
  a trigger type, for example, event trigger or periodic trigger; and
  trigger duration, where for example, it is determined that the trigger event has really triggered only when a measurement result of a target cell reaches or exceeds a threshold for duration of 5 ms.

The type of the trigger event may include but is not limited to any one of the following:
  a measurement result of a target cell reaches or exceeds a threshold;
  a measurement result of a serving cell reaches or is lower than a threshold;
  a difference between a measurement result of a target cell and a measurement result of a serving cell reaches or exceeds a threshold;
  a measurement result of a target cell reaches or exceeds a first threshold, and a measurement result of a serving cell reaches or is lower than a second threshold;
  a packet loss rate in data transmission of a serving cell reaches or exceeds a threshold; and
  a latency in data transmission of a serving cell reaches or exceeds a threshold.

The configuration information of the trigger condition may include effective duration of the trigger condition.

Step 502: After the source node receives, from one or more target nodes, configuration information of one or more condition-triggered target cells, the source node sends, to a terminal, an RRC message where the configuration information of the trigger condition is associated with the configuration information of the trigger event and the configuration information of the target cell. A method for associating the configuration information of the trigger condition and the configuration information of the trigger event configured in the RRC message may be as follows:

Method 1: (Multi-List Association)

The configuration includes the following lists:
  a trigger event information list;
  a trigger condition information list; and
  an association relationship list.

Each entry in the trigger event information list includes configuration information of a trigger event for conditional cell management, and may further include identification information (such as an event ID) corresponding to the configuration information of the trigger event.

Each entry in the trigger condition information list includes configuration information of a trigger condition for conditional cell management, and may further include identification information (such as a condition ID) corresponding to the configuration information of the trigger condition.

The association relationship list is used to indicate association relationships between configuration information of trigger events and configuration information of trigger conditions. Each association relationship in the association relationship list may include the following content:
  an entry tag (for example, a first entry in the list is "tag 1") of the trigger event information list and identification information corresponding to configuration information of a trigger condition.

Optionally, the configuration may further include a target cell configuration list, and an association relationship list between configuration information of trigger conditions and configuration information of target cells. Each entry in the target cell configuration list includes configuration information of a target cell for conditional cell management, and may additionally further include identification information (such as a reconfiguration ID) corresponding to the configuration information of the target cell.

Each association relationship in the association relationship list between configuration information of trigger conditions and configuration information of target cells includes at least one of the following:
- identification information corresponding to configuration information of a trigger condition and identification information corresponding to configuration information of a target cell;
- identification information corresponding to configuration information of a trigger condition and an entry tag (for example, a first entry in the list is "tag 1") of the target cell configuration list;
- an entry tag (for example, a first entry in the list is "tag 1") of the trigger condition information list and identification information corresponding to configuration information of a target cell; and
- an entry tag (for example, a first entry in the list is "tag 1") of the trigger condition information list and an entry tag (for example, a first entry in the list is "tag 1") of the target cell configuration list.

Method 2: (Single-List Association, where a Trigger Event and a Trigger Condition are in a Many-to-One Relationship)

The configuration includes the following list:
a trigger condition configuration information list.

Each entry in the trigger condition configuration information list includes configuration information of one trigger condition for conditional cell management and configuration information of a plurality of trigger events corresponding to the configuration information of the trigger condition.

Optionally, the configuration may further include a target cell configuration information list, where each entry in the target cell configuration information list may include any one of the following:
- configuration information of one trigger condition for conditional cell management and configuration information of one target cell;
- configuration information of one trigger condition for conditional cell management and configuration information of a plurality of target cells; and
- configuration information of a plurality of trigger conditions for conditional cell management and configuration information of one target cell.

Optionally, step 502 may also be replaced as follows: After receiving one or more pieces of request information that are sent by the source node for condition-triggered cell management, the target node sends an RRC message that has associated the configuration information of the trigger event, the configuration information of the trigger condition, and the configuration information of the target cell to the UE. A method for associating the configuration information of the trigger event and the configuration information of the trigger condition reconfigured in the RRC message is the same as the foregoing method, and is not described again herein. The RRC message may be directly delivered by the target node to the UE, or may be forwarded by the source node to the UE.

Step 503: The terminal device evaluates the trigger condition based on a network-side configuration. The evaluation method includes any one of the following:

Method 1 (corresponding to the method 1 in step 502): The UE evaluates a corresponding trigger event in the trigger event information list specified by the association relationship list.

Method 2 (corresponding to the method 2 in step 502): The UE evaluates a trigger event corresponding to a trigger condition in the trigger condition configuration information list.

Whether the trigger condition is satisfied may be evaluated based on the following evaluation method:
- if any trigger event corresponding to the trigger condition is satisfied, it is considered that the trigger condition is satisfied;
- if a plurality of trigger events corresponding to the trigger condition are satisfied, it is considered that the trigger condition is satisfied, where a specific quantity of satisfied trigger events may be agreed upon based on a protocol or configured by a network; and
- if all trigger events corresponding to the trigger condition are satisfied, it is considered that the trigger condition is satisfied.

Step 504: When the trigger condition is satisfied, the terminal device evaluates whether a target cell configuration is applied.

The evaluation method may include any one of the following:
- if any trigger condition corresponding to the target cell configuration is satisfied, the target cell configuration is applied;
- if a plurality of trigger conditions corresponding to the target cell configuration are satisfied, the target cell configuration is applied, where a specific quantity of satisfied trigger conditions may be agreed upon based on the protocol or configured by the network; and
- if all trigger conditions corresponding to the target cell configuration are satisfied, the target cell configuration is applied.

In this embodiment of this disclosure, when a manner of condition-triggered cell management is used, UE may evaluate a trigger condition based on a plurality of trigger events to further decide whether to perform a procedure such as cell handover or cell addition or cell deletion or cell change, thereby improving decision accuracy. For example, whether to perform handover is evaluated based on a plurality of trigger events. This can further increase a handover success rate and avoid unnecessary handover, and maximize utilization of network resources.

Figure 6:
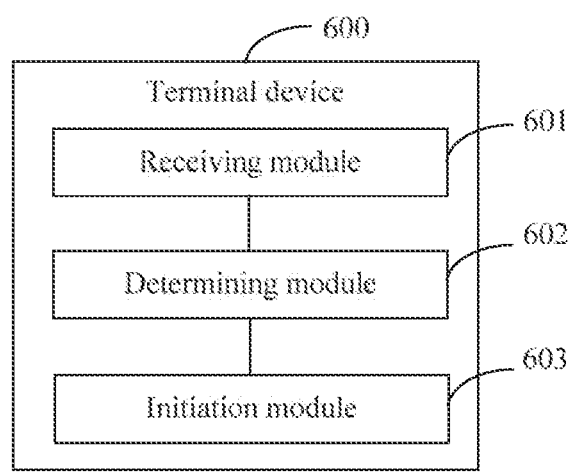
FIG. 6 is a structural diagram of a terminal device according to an embodiment of this disclosure.

FIG. 6 is a structural diagram of a terminal device according to an embodiment of this disclosure. As shown in FIG. 6, the terminal device 600 includes a receiving module 601, a determining module 602, and an initiation module 603.

The receiving module 601 is configured to receive configuration information of a trigger condition and configuration information of a trigger event that are sent by a network-side device, where an association relationship exists between the configuration information of the trigger condition and the configuration information of the trigger event, and configuration information of one trigger condition is associated with configuration information of at least two trigger events.

The determining module 602 is configured to determine, based on the configuration information of the at least two trigger events associated with the configuration information of the trigger condition, whether the trigger condition is satisfied.

The initiation module 603 is configured to initiate a radio resource control RRC procedure for cell management when the trigger condition is satisfied.

Optionally, in some implementations, a conditional handover (CHO) is defined as a handover that is executed by a UE when one or more handover execution conditions are met. The UE starts evaluating the execution condition(s) upon receiving CHO configuration, and stops evaluating the execution condition(s) once a handover is executed (legacy handover or conditional handover execution).

The following principle applies to CHO:

The CHO configuration contains configuration of CHO candidate cell(s) generated by candidate gNB(s) and execution condition(s) generated by a source gNB.

For example, the configuration information of the trigger event may be stored in a trigger event information list, each entry in the trigger event information list includes configuration information of a trigger event and identification information corresponding to the configuration information of the trigger event. The identification information in the trigger event information list may be measurement identification (MeasID), and if event(s) associated to all measId(s) within conditional trigger configuration (condTriggerConfig) for a target candidate cell within the stored cell configuration (condRRCReconfig) are fulfilled, then the target candidate cell within the stored condRRCReconfig, associated to that conditional reconfiguration identification (condReconfigId), is considered as a triggered cell, or, the conditional reconfiguration execution is initiated.

Optionally, the configuration information of the trigger condition is stored in a trigger condition information list, the configuration information of the trigger event is stored in a trigger event information list, and the association relationship is stored in an association relationship list; or the configuration information of the trigger condition and the configuration information of the trigger event are stored in a trigger condition configuration information list, where each entry in the trigger condition configuration information list includes configuration information of a trigger condition and configuration information of at least two trigger events corresponding to the configuration information of the trigger condition.

In some implementations, the trigger condition configuration information list may be CondReconfigToAddModList, the configuration information of the trigger event may be condExecutionCond, each entry in the trigger condition configuration information list may be equivalent to CondReconfigToAddMod, and each entry in the trigger condition configuration information list may include configuration information of a trigger condition and configuration information of at least two trigger events corresponding to the configuration information of the trigger condition. The configuration information of the trigger condition may be equivalent to condReconfigId, and association with the corresponding configuration information of at least two trigger events may be implemented via condExecutionCond.

Optionally, each entry in the trigger condition information list includes configuration information of a trigger condition and identification information corresponding to the configuration information of the trigger condition;

each entry in the trigger event information list includes configuration information of a trigger event and identification information corresponding to the configuration information of the trigger event; and the association relationship includes:

an association relationship between identification information corresponding to configuration information of a trigger condition and an entry tag of the trigger event information list; or an association relationship between an entry tag of the trigger condition information list and identification information corresponding to configuration information of a trigger event; or an association relationship between an entry tag of the trigger condition information list and an entry tag of the trigger event information list; or an association relationship between identification information corresponding to configuration information of a trigger condition and identification information in the trigger event information list; or an association relationship between an entry tag of the trigger condition information list and identification information in the trigger event information list.

In some implementations, the association relationship between the identification information corresponding to the configuration information of the trigger condition and the identification information in the trigger event information list may include:

an association relationship between the identification information corresponding to the configuration information of the trigger condition and identification information corresponding to configuration information of a trigger event.

The identification information in the trigger event information list may be measurement identification (MeasID), or target terminal identification, or event identification, etc.

Optionally, the configuration information of the trigger event includes at least one of the following: a type of the trigger event, a measurement parameter of the trigger event, a threshold of the trigger event, a trigger type, and trigger duration.

Optionally, the type of the trigger event includes any one of the following:

a first trigger event based on a measurement result of a target cell;

a second trigger event based on a measurement result of a serving cell;

a third trigger event based on a measurement result of a target cell and a measurement result of a serving cell;

a fourth trigger event based on a packet loss rate in data transmission of a serving cell; and a fifth trigger event based on a latency in data transmission of a serving cell.

Optionally, the configuration information of the trigger condition includes effective duration of the trigger condition.

Optionally, the determining module is specifically configured to:

when configuration information of any trigger event in the configuration information of the at least two trigger events associated with the configuration information of the trigger condition is satisfied, determine that the trigger condition is satisfied; or when configuration information of N trigger events in the configuration information of the at least two trigger events associated with the configuration information of the trigger condition is satisfied, determine that the trigger condition is satisfied, where N is an integer greater than 1; or when configuration information of all trigger events in the configuration information of the at least two trigger events associated with the configuration information of the trigger condition is satisfied, determine that the trigger condition is satisfied.

Optionally, a value of N may be predefined by a protocol or configured by the network-side device.

Optionally, the receiving module is specifically configured to:
receive the configuration information of the trigger condition and the configuration information of the trigger event that are sent by a source node; or
receive the configuration information of the trigger condition and the configuration information of the trigger event that are sent by a target node through a source node.

The terminal device 600 provided in this embodiment of this disclosure can implement the procedures implemented by the terminal device in the method embodiments in FIG. 3 and FIG. 5. To avoid repetition, details are not described again herein.

In the terminal device 600 in this embodiment of this disclosure, the receiving module 601 is configured to receive configuration information of a trigger condition and configuration information of a trigger event that are sent by a network-side device, where an association relationship exists between the configuration information of the trigger condition and the configuration information of the trigger event, and configuration information of one trigger condition is associated with configuration information of at least two trigger events; the determining module 602 is configured to determine, based on the configuration information of the at least two trigger events associated with the configuration information of the trigger condition, whether the trigger condition is satisfied; and the initiation module 603 is configured to initiate a radio resource control RRC procedure for cell management when the trigger condition is satisfied. This not only standardizes how a trigger condition is configured for a condition-triggered cell management procedure, but also makes a decision result more accurate.

Figure 7:
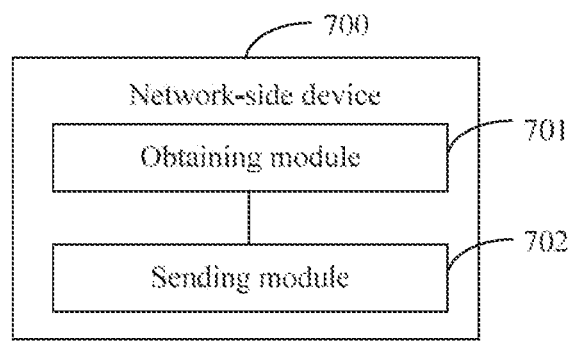
FIG. 7 is a structural diagram of a network-side device according to an embodiment of this disclosure.

FIG. 7 is a structural diagram of a network-side device according to an embodiment of this disclosure. The network-side device is a source node or a target node. As shown in FIG. 7, the network-side device 700 includes an obtaining module 701 and a sending module 702.

The obtaining module 701 is configured to obtain configuration information of a trigger condition and configuration information of a trigger event.

The sending module 702 is configured to send the configuration information of the trigger condition and the configuration information of the trigger event to a terminal device, where an association relationship exists between the configuration information of the trigger condition and the configuration information of the trigger event, and configuration information of one trigger condition is associated with configuration information of at least two trigger events.

Optionally, in some implementations, a conditional handover (CHO) is defined as a handover that is executed by a UE when one or more handover execution conditions are met. The UE starts evaluating the execution condition(s) upon receiving CHO configuration, and stops evaluating the execution condition(s) once a handover is executed (legacy handover or conditional handover execution).

The following principle applies to CHO:
The CHO configuration contains configuration of CHO candidate cell(s) generated by candidate gNB(s) and execution condition(s) generated by a source gNB.

For example, the configuration information of the trigger event may be stored in a trigger event information list, each entry in the trigger event information list includes configuration information of a trigger event and identification information corresponding to the configuration information of the trigger event. The identification information in the trigger event information list may be measurement identification (MeasID), and if event(s) associated to all measId(s) within conditional trigger configuration (condTriggerConfig) for a target candidate cell within the stored cell configuration (condRRCReconfig) are fulfilled, then the target candidate cell within the stored condRRCReconfig, associated to that conditional reconfiguration identification (condReconfigId), is considered as a triggered cell, or, the conditional reconfiguration execution is initiated.

Optionally, the configuration information of the trigger condition is stored in a trigger condition information list, the configuration information of the trigger event is stored in a trigger event information list, and the association relationship is stored in an association relationship list; or the configuration information of the trigger condition and the configuration information of the trigger event are stored in a trigger condition configuration information list, where each entry in the trigger condition configuration information list includes configuration information of a trigger condition and configuration information of at least two trigger events corresponding to the configuration information of the trigger condition.

In some implementations, the trigger condition configuration information list may be CondReconfigToAddModList, the configuration information of the trigger event may be condExecutionCond, each entry in the trigger condition configuration information list may be equivalent to CondReconfigToAddMod, and each entry in the trigger condition configuration information list may include configuration information of a trigger condition and configuration information of at least two trigger events corresponding to the configuration information of the trigger condition. The configuration information of the trigger condition may be equivalent to condReconfigId, and association with the corresponding configuration information of at least two trigger events may be implemented via condExecutionCond.

Optionally, each entry in the trigger condition information list includes configuration information of a trigger condition and identification information corresponding to the configuration information of the trigger condition;
each entry in the trigger event information list includes configuration information of a trigger event and identification information corresponding to the configuration information of the trigger event; and
the association relationship includes:
an association relationship between identification information corresponding to configuration information of a trigger condition and an entry tag of the trigger event information list; or
an association relationship between an entry tag of the trigger condition information list and identification information corresponding to configuration information of a trigger event; or
an association relationship between an entry tag of the trigger condition information list and an entry tag of the trigger event information list; or
an association relationship between identification information corresponding to configuration information of a trigger condition and identification information in the trigger event information list; or
an association relationship between an entry tag of the trigger condition information list and identification information in the trigger event information list.

In some implementations, the association relationship between the identification information corresponding to the configuration information of the trigger condition and the identification information in the trigger event information list may include:

an association relationship between the identification information corresponding to the configuration information of the trigger condition and identification information corresponding to configuration information of a trigger event.

The identification information in the trigger event information list may be measurement identification (MeasID), or target terminal identification, or event identification, etc.

Optionally, the configuration information of the trigger event includes at least one of the following: a type of the trigger event, a measurement parameter of the trigger event, a threshold of the trigger event, a trigger type, and trigger duration.

Optionally, the type of the trigger event includes any one of the following:
- a first trigger event based on a measurement result of a target cell;
- a second trigger event based on a measurement result of a serving cell;
- a third trigger event based on a measurement result of a target cell and a measurement result of a serving cell;
- a fourth trigger event based on a packet loss rate in data transmission of a serving cell; and
- a fifth trigger event based on a latency in data transmission of a serving cell.

Optionally, the configuration information of the trigger condition includes effective duration of the trigger condition.

Optionally, when the network-side device is the source node, the sending module is specifically configured to:

when configuration information of a target cell that is sent by the target node is received, send the configuration information of the trigger condition and the configuration information of the trigger event to the terminal device; or when the configuration information of the trigger condition and the configuration information of the trigger event that are sent by the target node are received, send the configuration information of the trigger condition and the configuration information of the trigger event to the terminal device.

Optionally, when the network-side device is the target node, the sending module is specifically configured to:

when request information that is sent by the source node for condition-triggered cell management is received, send the configuration information of the trigger condition and the configuration information of the trigger event to the terminal device through the source node.

Optionally, the configuration information of the trigger condition and the configuration information of the trigger event are determined through negotiation between the target node and the source node.

The network-side device 700 provided in this embodiment of this disclosure can implement the procedures implemented by the network-side device in the method embodiments in FIG. 4 and FIG. 5. To avoid repetition, details are not described again herein.

In the network-side device 700 in this embodiment of this disclosure, the obtaining module 701 is configured to obtain configuration information of a trigger condition and configuration information of a trigger event; and the sending module 702 is configured to send the configuration information of the trigger condition and the configuration information of the trigger event to a terminal device, where an association relationship exists between the configuration information of the trigger condition and the configuration information of the trigger event, and configuration information of one trigger condition is associated with configuration information of at least two trigger events. Therefore, the terminal device may evaluate the trigger condition based on the configuration information of the at least two trigger events associated with the configuration information of the trigger condition, to decide whether to initiate an RRC procedure for cell management. This not only standardizes how a trigger condition is configured for a condition-triggered cell management procedure, but also makes a decision result more accurate.

Figure 8:
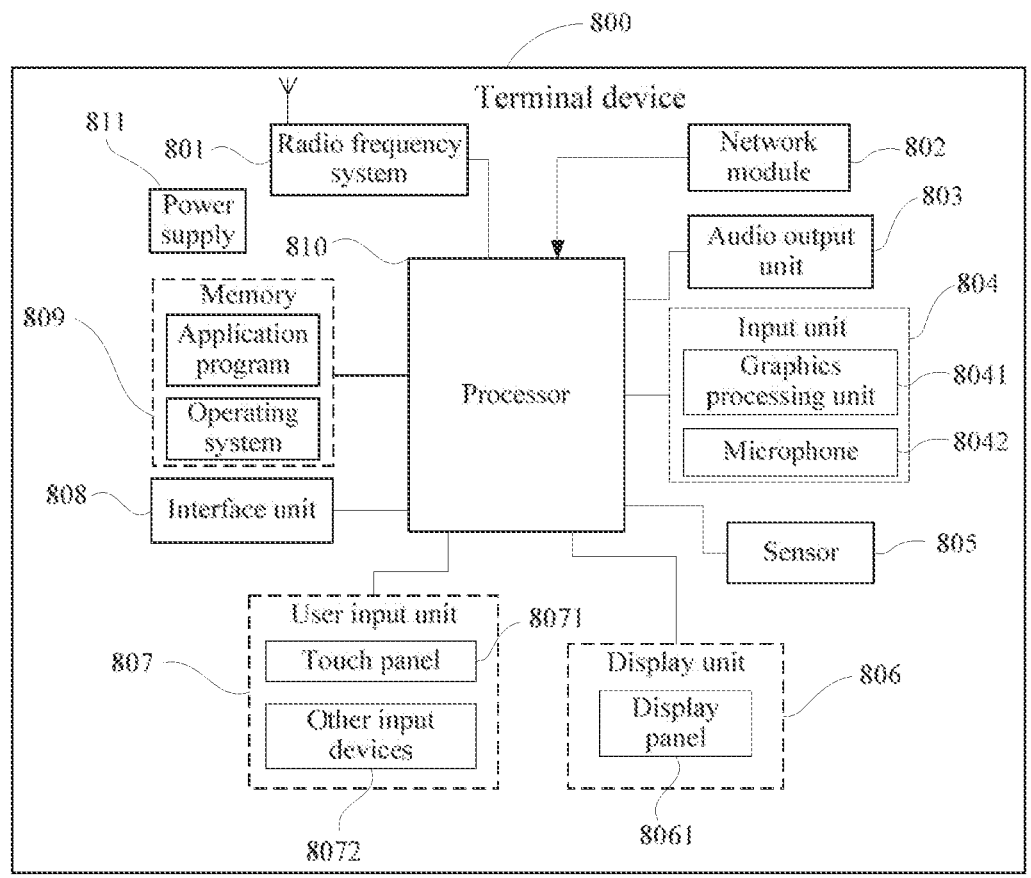
FIG. 8 is a structural diagram of a terminal device according to another embodiment of this disclosure.

FIG. 8 is a structural diagram of a terminal device according to another embodiment of this disclosure. Referring to FIG. 8, the terminal device 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art may understand that the structure of the terminal device shown in FIG. 8 does not constitute a limitation on the terminal device. A quantity of components included in the terminal device may be greater or less than that shown in the figure, or some components are combined, or component arrangements are different. In this implementation, the terminal device includes but is not limited to a mobile phone, a tablet computer, a notebook computer, a palmtop computer, an in-vehicle terminal, a wearable device, a pedometer, or the like.

The radio frequency unit 801 is configured to receive configuration information of a trigger condition and configuration information of a trigger event that are sent by a network-side device, where an association relationship exists between the configuration information of the trigger condition and the configuration information of the trigger event, and configuration information of one trigger condition is associated with configuration information of at least two trigger events.

The processor 810 is configured to determine, based on the configuration information of the at least two trigger events associated with the configuration information of the trigger condition, whether the trigger condition is satisfied; and initiate a radio resource control RRC procedure for cell management when the trigger condition is satisfied.

This embodiment of this disclosure not only standardizes how a trigger condition is configured for a condition-triggered cell management procedure, but also makes a decision result more accurate by evaluating the trigger condition based on the configuration information of the at least two trigger events associated with the configuration information of the trigger condition.

Optionally, in some implementations, a conditional handover (CHO) is defined as a handover that is executed by a UE when one or more handover execution conditions are met. The UE starts evaluating the execution condition(s) upon receiving CHO configuration, and stops evaluating the execution condition(s) once a handover is executed (legacy handover or conditional handover execution).

The following principle applies to CHO:

The CHO configuration contains configuration of CHO candidate cell(s) generated by candidate gNB(s) and execution condition(s) generated by a source gNB.

For example, the configuration information of the trigger event may be stored in a trigger event information list, each entry in the trigger event information list includes configuration information of a trigger event and identification information corresponding to the configuration information of the trigger event. The identification information in the trigger event information list may be measurement identification (MeasID), and if event(s) associated to all measId(s) within conditional trigger configuration (condTriggerConfig) for a target candidate cell within the stored cell configuration (condRRCReconfig) are fulfilled, then the target candidate cell within the stored condRRCReconfig, associated to that conditional reconfiguration identification (condReconfigId), is considered as a triggered cell, or, the conditional reconfiguration execution is initiated.

Optionally, the configuration information of the trigger condition is stored in a trigger condition information list, the configuration information of the trigger event is stored in a trigger event information list, and the association relationship is stored in an association relationship list; or the configuration information of the trigger condition and the configuration information of the trigger event are stored in a trigger condition configuration information list, where each entry in the trigger condition configuration information list includes configuration information of a trigger condition and configuration information of at least two trigger events corresponding to the configuration information of the trigger condition.

In some implementations, the trigger condition configuration information list may be CondReconfigToAddModList, the configuration information of the trigger event may be condExecutionCond, each entry in the trigger condition configuration information list may be equivalent to CondReconfigToAddMod, and each entry in the trigger condition configuration information list may include configuration information of a trigger condition and configuration information of at least two trigger events corresponding to the configuration information of the trigger condition. The configuration information of the trigger condition may be equivalent to condReconfigId, and association with the corresponding configuration information of at least two trigger events may be implemented via condExecutionCond.

Optionally, each entry in the trigger condition information list includes configuration information of a trigger condition and identification information corresponding to the configuration information of the trigger condition;

each entry in the trigger event information list includes configuration information of a trigger event and identification information corresponding to the configuration information of the trigger event; and the association relationship includes:

an association relationship between identification information corresponding to configuration information of a trigger condition and an entry tag of the trigger event information list; or an association relationship between an entry tag of the trigger condition information list and identification information corresponding to configuration information of a trigger event; or an association relationship between an entry tag of the trigger condition information list and an entry tag of the trigger event information list; or an association relationship between identification information corresponding to configuration information of a trigger condition and identification information in the trigger event information list; or an association relationship between an entry tag of the trigger condition information list and identification information in the trigger event information list.

In some implementations, the association relationship between the identification information corresponding to the configuration information of the trigger condition and the identification information in the trigger event information list may include:

an association relationship between the identification information corresponding to the configuration information of the trigger condition and identification information corresponding to configuration information of a trigger event.

The identification information in the trigger event information list may be measurement identification (MeasID), or target terminal identification, or event identification, etc.

Optionally, the configuration information of the trigger event includes at least one of the following: a type of the trigger event, a measurement parameter of the trigger event, a threshold of the trigger event, a trigger type, and trigger duration.

Optionally, the type of the trigger event includes any one of the following:
a first trigger event based on a measurement result of a target cell;
a second trigger event based on a measurement result of a serving cell;
a third trigger event based on a measurement result of a target cell and a measurement result of a serving cell;
a fourth trigger event based on a packet loss rate in data transmission of a serving cell; and
a fifth trigger event based on a latency in data transmission of a serving cell.

Optionally, the configuration information of the trigger condition includes effective duration of the trigger condition.

Optionally, the processor 810 is further configured to:
when configuration information of any trigger event in the configuration information of the at least two trigger events associated with the configuration information of the trigger condition is satisfied, determine that the trigger condition is satisfied; or
when configuration information of N trigger events in the configuration information of the at least two trigger events associated with the configuration information of the trigger condition is satisfied, determine that the trigger condition is satisfied, where N is an integer greater than 1; or
when configuration information of all trigger events in the configuration information of the at least two trigger events associated with the configuration information of the trigger condition is satisfied, determine that the trigger condition is satisfied.

Optionally, a value of N may be predefined by a protocol or configured by the network-side device.

Optionally, the processor 810 is further configured to:
receive the configuration information of the trigger condition and the configuration information of the trigger event that are sent by a source node; or
receive the configuration information of the trigger condition and the configuration information of the trigger event that are sent by a target node through a source node.

It should be understood that in this implementation, the radio frequency unit 801 may be configured to receive and send signals in an information reception or transmission or call process. Specifically, after receiving downlink data from a base station, the radio frequency unit 801 sends the downlink data to the processor 810 for processing, and in addition, sends uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and other devices through a wireless communications system.

The terminal device provides wireless broadband Internet access for a user by using the network module 802, for example, helps the user send and receive e-mails, browse web pages, and access streaming media.

The audio output unit 803 may convert audio data received by the radio frequency unit 801 or the network module 802 or stored in the memory 809 into an audio signal, and output the audio signal as a sound. In addition, the audio output unit 803 may further provide an audio output (for example, a call signal reception sound or a message reception sound) related to a specific function performed by the terminal device 800. The audio output unit 803 includes a speaker, a buzzer, a telephone receiver, and the like.

The input unit 804 is configured to receive an audio or video signal. The input unit 804 may include a graphics processing unit (GPU) 8041 and a microphone 8042. The graphics processing unit 8041 processes image data of a still picture or a video obtained by an image capture apparatus (for example, a camera) in an image capture mode or a video capture mode. A processed image frame may be displayed on the display unit 806. An image frame processed by the graphics processing unit 8041 may be stored in the memory 809 (or other storage media) or sent by the radio frequency unit 801 or the network module 802. The microphone 8042 can receive a sound and can process the sound into audio data. The processed audio data may be converted in a telephone call mode into a format that can be sent by the radio frequency unit 801 to a mobile communications base station, for outputting.

The terminal device 800 further includes at least one sensor 805, for example, a light sensor, a motion sensor, and other sensors. Specifically, the light sensor includes an ambient light sensor and a proximity sensor. The ambient light sensor may adjust luminance of a display panel 8061 based on brightness of ambient light. The proximity sensor may turn off and/or backlight the display panel 8061 when the terminal device 800 moves to an car. As a type of motion sensor, an accelerometer sensor may detect acceleration magnitudes in all directions (generally three axes), and when the accelerometer sensor is stationary, may detect a magnitude and a direction of gravity, and may be configured for terminal device posture recognition (such as switching between landscape and portrait, related games, and magnetometer posture calibration), vibration recognition related functions (such as a pedometer and stroke), and the like. The sensor 805 may further include a fingerprint sensor, a pressure sensor, an iris sensor, a molecular sensor, a gyroscope, a barometer, a hygrometer, a thermometer, an infrared sensor, or the like. Details are not described herein.

The display unit 806 is configured to display information input by the user or information provided for the user. The display unit 806 may include the display panel 8061. The display panel 8061 may be configured in a form of a liquid crystal display (LCD), an organic light-emitting diode (OLED), or the like.

The user input unit 807 may be configured to receive input digit or character information, and generate a key signal input related to user settings and function control of the terminal device. Specifically, the user input unit 807 includes a touch panel 8071 and other input devices 8072. The touch panel 8071, also referred to as a touchscreen, may capture a touch operation performed by the user on or near the touch panel (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 810, and receives and executes a command sent by the processor 810. In addition, the touch panel 8071 may be implemented in a plurality of forms, for example, a resistive, capacitive, infrared, or surface acoustic wave touch panel. The user input unit 807 may further include the other input devices 8072 in addition to the touch panel 8071. Specifically, the other input devices 8072 may include but are not limited to a physical keyboard, a function key (such as a volume control key or a power on/off key), a trackball, a mouse, a joystick, and the like. Details are not described herein.

Further, the touch panel 8071 may cover the display panel 8061. After the touch panel 8071 detects a touch operation on or near the touch panel, the touch panel 8071 transmits the touch operation to the processor 810 to determine a type of a touch event. Then the processor 810 provides a corresponding visual output on the display panel 8061 based on the type of the touch event. Although the touch panel 8071 and the display panel 8061 are used as two independent components to implement input and output functions of the terminal device in FIG. 8, the touch panel 8071 and the display panel 8061 may be integrated to implement the input and output functions of the terminal device in some embodiments. This is not specifically limited herein.

The interface unit 808 is an interface for connecting an external apparatus to the terminal device 800. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 808 may be configured to receive an input (for example, data information or power) from an external apparatus, and transmit the received input to one or more components in the terminal device 800, or may be configured to transmit data between the terminal device 800 device and an external apparatus.

The memory 809 may be configured to store a software program and various data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high-speed random access memory, or may include a non-volatile memory, for example, at least one magnetic disk storage device, a flash memory, or other non-volatile solid-state storage devices.

The processor 810 is a control center of the terminal device. The processor 810 uses various interfaces and lines to connect all parts of the entire terminal device, and performs various functions and data processing of the terminal device by running or executing software programs and/or modules stored in the memory 809 and calling data stored in the memory 809, thereby performing overall monitoring on the terminal device. The processor 810 may include one or more processing units. Optionally, the processor 810 may integrate an application processor and a modem processor. The application processor mainly processes the operating system, user interface, application program, and the like. The modem processor mainly processes wireless communication. It may be understood that the modem processor may alternatively not be integrated into the processor 810.

The terminal device 800 may further include the power supply 811 (such as a battery) supplying power to each component. Optionally, the power supply 811 may be logically connected to the processor 810 by using a power management system, so that functions such as charge and discharge management and power consumption management are implemented by using the power management system.

In addition, the terminal device 800 includes some functional modules that are not illustrated. Details are not described herein.

Optionally, an embodiment of this disclosure further provides a terminal device, including a processor 810, a memory 809, and a computer program stored in the memory 809 and capable of running on the processor 810. When the computer program is executed by the processor 810, the procedures of the foregoing embodiment of the cell management method are implemented, and a same technical effect can be achieved. To avoid repetition, details are not described again herein.

An embodiment of this disclosure further provides a computer-readable storage medium, where the computer-readable storage medium stores a computer program. When the computer program is executed by a processor, the procedures of the foregoing embodiment of the cell management method are implemented, and a same technical effect can be achieved. To avoid repetition, details are not described again herein. The computer-readable storage medium is, for example, a read-only memory (ROM), a random access memory (RAM), a magnetic disk, or an optical disc.

Figure 9:
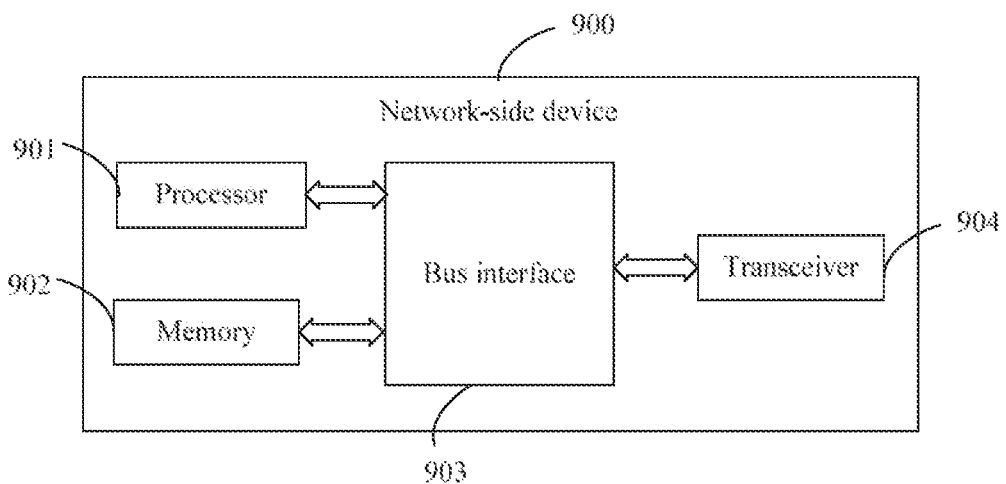
FIG. 9 is a structural diagram of a network-side device according to another embodiment of this disclosure.

FIG. 9 is a structural diagram of a network-side device according to another embodiment of this disclosure. The network-side device may be a source node or a target node. As shown in FIG. 9, the network-side device 900 includes a processor 901, a memory 902, a bus interface 903, and a transceiver 904, where the processor 901, the memory 902, and the transceiver 904 are all connected to the bus interface 903.

In this embodiment of this disclosure, the network-side device 900 further includes a computer program stored in the memory 902 and capable of running on the processor 901. When the computer program is executed by the processor 901, the following steps are implemented:

obtaining configuration information of a trigger condition and configuration information of a trigger event; and sending the configuration information of the trigger condition and the configuration information of the trigger event to a terminal device, where an association relationship exists between the configuration information of the trigger condition and the configuration information of the trigger event, and configuration information of one trigger condition is associated with configuration information of at least two trigger events.

Optionally, in some implementations, a conditional handover (CHO) is defined as a handover that is executed by a UE when one or more handover execution conditions are met. The UE starts evaluating the execution condition(s) upon receiving CHO configuration, and stops evaluating the execution condition(s) once a handover is executed (legacy handover or conditional handover execution).

The following principle applies to CHO:

The CHO configuration contains configuration of CHO candidate cell(s) generated by candidate gNB(s) and execution condition(s) generated by a source gNB.

For example, the configuration information of the trigger event may be stored in a trigger event information list, each entry in the trigger event information list includes configuration information of a trigger event and identification information corresponding to the configuration information of the trigger event. The identification information in the trigger event information list may be measurement identification (MeasID), and if event(s) associated to all measId(s) within conditional trigger configuration (condTriggerConfig) for a target candidate cell within the stored cell configuration (condRRCReconfig) are fulfilled, then the target candidate cell within the stored condRRCReconfig, associated to that conditional reconfiguration identification (condReconfigId), is considered as a triggered cell, or, the conditional reconfiguration execution is initiated.

Optionally, the configuration information of the trigger condition is stored in a trigger condition information list, the configuration information of the trigger event is stored in a trigger event information list, and the association relationship is stored in an association relationship list; or the configuration information of the trigger condition and the configuration information of the trigger event are stored in a trigger condition configuration information list, where each entry in the trigger condition configuration information list includes configuration information of a trigger condition and configuration information of at least two trigger events corresponding to the configuration information of the trigger condition.

In some implementations, the trigger condition configuration information list may be CondReconfigToAddModList, the configuration information of the trigger event may be condExecutionCond, each entry in the trigger condition configuration information list may be equivalent to CondReconfigToAddMod, and each entry in the trigger condition configuration information list may include configuration information of a trigger condition and configuration information of at least two trigger events corresponding to the configuration information of the trigger condition. The configuration information of the trigger condition may be equivalent to condReconfigId, and association with the corresponding configuration information of at least two trigger events may be implemented via condExecutionCond.

Optionally, each entry in the trigger condition information list includes configuration information of a trigger condition and identification information corresponding to the configuration information of the trigger condition;

each entry in the trigger event information list includes configuration information of a trigger event and identification information corresponding to the configuration information of the trigger event; and the association relationship includes:

an association relationship between identification information corresponding to configuration information of a trigger condition and an entry tag of the trigger event information list; or an association relationship between an entry tag of the trigger condition information list and identification information corresponding to configuration information of a trigger event; or an association relationship between an entry tag of the trigger condition information list and an entry tag of the trigger event information list; or an association relationship between identification information corresponding to configuration information of a trigger condition and identification information in the trigger event information list; or an association relationship between an entry tag of the trigger condition information list and identification information in the trigger event information list.

In some implementations, the association relationship between the identification information corresponding to the configuration information of the trigger condition and the identification information in the trigger event information list may include:

an association relationship between the identification information corresponding to the configuration information of the trigger condition and identification information corresponding to configuration information of a trigger event.

The identification information in the trigger event information list may be measurement identification (MeasID), or target terminal identification, or event identification, etc.

Optionally, the configuration information of the trigger event includes at least one of the following: a type of the trigger event, a measurement parameter of the trigger event, a threshold of the trigger event, a trigger type, and trigger duration.

Optionally, the type of the trigger event includes any one of the following:
  a first trigger event based on a measurement result of a target cell;
  a second trigger event based on a measurement result of a serving cell;
  a third trigger event based on a measurement result of a target cell and a measurement result of a serving cell;
  a fourth trigger event based on a packet loss rate in data transmission of a serving cell; and
  a fifth trigger event based on a latency in data transmission of a serving cell.

Optionally, the configuration information of the trigger condition includes effective duration of the trigger condition.

Optionally, when the method is applied to the source node, when the computer program is executed by the processor 901, the following step may be further implemented:
  when receiving configuration information of a target cell that is sent by the target node, sending the configuration information of the trigger condition and the configuration information of the trigger event to the terminal device; or
  when receiving the configuration information of the trigger condition and the configuration information of the trigger event that are sent by the target node, sending the configuration information of the trigger condition and the configuration information of the trigger event to the terminal device.

Optionally, when the method is applied to the target node, when the computer program is executed by the processor 901, the following step may be further implemented:
  when receiving request information that is sent by the source node for condition-triggered cell management, sending the configuration information of the trigger condition and the configuration information of the trigger event to the terminal device through the source node.

Optionally, the configuration information of the trigger condition and the configuration information of the trigger event are determined through negotiation between the target node and the source node.

An embodiment of this disclosure further provides a network-side device, including a processor 901, a memory 902, and a computer program stored in the memory 902 and capable of running on the processor 901. When the computer program is executed by the processor 901, the procedures of the foregoing embodiment of the trigger condition configuration method are implemented, and a same technical effect can be achieved. To avoid repetition, details are not described again herein.

An embodiment of this disclosure further provides a computer-readable storage medium, where the computer-readable storage medium stores a computer program. When the computer program is executed by a processor, the procedures of the foregoing embodiment of the trigger condition configuration method are implemented, and a same technical effect can be achieved. To avoid repetition, details are not described again herein. The computer-readable storage medium is, for example, a read-only memory (ROM), a random access memory (RAM), a magnetic disk, or an optical disc.

It should be noted that in this specification, the term "comprise", "include", or any of their variants is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

What is claimed is:

1. A cell management method, applied to a terminal device and comprising:
  receiving configuration information of a trigger condition and configuration information of a trigger event that are sent by a network-side device, wherein an association relationship exists between the configuration information of the trigger condition and the configuration information of the trigger event, and configuration information of one trigger condition is associated with pieces of configuration information of at least two trigger events;

determining, based on the pieces of configuration information of the at least two trigger events associated with the configuration information of the trigger condition, whether the trigger condition is satisfied; and when the trigger condition is satisfied, initiating a radio resource control RRC procedure for cell management;

wherein the receiving the configuration information of the trigger condition and the configuration information of the trigger event that are sent by the network-side device comprises:

receiving the configuration information of the trigger condition and the configuration information of the trigger event, which are sent by a source node after the source node associates the configuration information of the trigger condition with the configuration information of the trigger event in a case that the source node receives configuration information of a target cell of one or more target nodes.

2. The method according to claim 1, wherein the configuration information of the trigger condition is stored in a trigger condition information list, the configuration information of the trigger event is stored in a trigger event information list, and the association relationship is stored in an association relationship list; or the configuration information of the trigger condition and the configuration information of the trigger event are stored in a trigger condition configuration information list, wherein each entry in the trigger condition configuration information list comprises configuration information of a trigger condition and configuration information of at least two trigger events corresponding to the configuration information of the trigger condition.

3. The method according to claim 2, wherein each entry in the trigger condition information list comprises configuration information of a trigger condition and identification information corresponding to the configuration information of the trigger condition;

each entry in the trigger event information list comprises configuration information of a trigger event and identification information corresponding to the configuration information of the trigger event; and the association relationship comprises:

an association relationship between identification information corresponding to configuration information of a trigger condition and an entry tag of the trigger event information list; or an association relationship between an entry tag of the trigger condition information list and identification information corresponding to configuration information of a trigger event; or an association relationship between an entry tag of the trigger condition information list and an entry tag of the trigger event information list; or an association relationship between identification information corresponding to configuration information of a trigger condition and identification information in the trigger event information list; or an association relationship between an entry tag of the trigger condition information list and identification information in the trigger event information list.

4. The method according to claim 3, wherein the association relationship between the identification information corresponding to the configuration information of the trigger condition and the identification information in the trigger event information list comprises:

an association relationship between the identification information corresponding to the configuration information of the trigger condition and identification information corresponding to configuration information of a trigger event;

wherein the identification information corresponding to the configuration information of the trigger event comprises at least one of: measurement identification (MeasID), target terminal identification, or event identification.

5. The method according to claim 1, wherein the configuration information of the trigger event comprises at least one of the following: a type of the trigger event, a measurement parameter of the trigger event, a threshold of the trigger event, a trigger type, or trigger duration.

6. The method according to claim 5, wherein the type of the trigger event comprises at least one of the following:

a first trigger event based on a measurement result of a target cell;

a second trigger event based on a measurement result of a serving cell;

a third trigger event based on a measurement result of a target cell and a measurement result of a serving cell;

a fourth trigger event based on a packet loss rate in data transmission of a serving cell; or a fifth trigger event based on a latency in data transmission of a serving cell.

7. The method according to claim 1, wherein the configuration information of the trigger condition comprises effective duration of the trigger condition.

8. The method according to claim 1, wherein the determining, based on the pieces of configuration information of the at least two trigger events associated with the configuration information of the trigger condition, whether the trigger condition is satisfied comprises:

when configuration information of any trigger event in the pieces of configuration information of the at least two trigger events associated with the configuration information of the trigger condition is satisfied, determining that the trigger condition is satisfied; or when configuration information of N trigger events in the pieces of configuration information of the at least two trigger events associated with the configuration information of the trigger condition is satisfied, determining that the trigger condition is satisfied, wherein N is an integer greater than 1; or when configuration information of all trigger events in the pieces of configuration information of the at least two trigger events associated with the configuration information of the trigger condition is satisfied, determining that the trigger condition is satisfied.

9. The method according to claim 1, wherein the pieces of configuration information of the at least two trigger events comprise a same first parameter, the first parameter being a type of trigger event;

wherein the pieces of configuration information of the at least two trigger events comprise different second parameters, the second parameter being at least one of the following: a measurement parameter of trigger event, a threshold of trigger event, a trigger type, or trigger duration.

10. The method according to claim 1, wherein the configuration information of the trigger condition comprises effective duration of the trigger condition, and the effective duration of the trigger condition is used to indicate that the trigger condition is effective in the effective duration and is not effective beyond the effective duration.

11. The method according to claim 1, wherein the source node and the target node are a source base station and a target base station respectively in a cell handover procedure; or, the source node and the target node are a source secondary node and a target secondary node respectively in a dual connectivity architecture.

12. The method according to claim 1, wherein the cell management comprises: cell handover in conditional handover; or, secondary node addition, change, release, or modification triggered by a master node in a dual connectivity architecture; or, secondary node addition, change, release, or modification triggered by a secondary node in a dual connectivity architecture.

13. A terminal device, comprising a processor, a memory, and a program stored in the memory and capable of running on the processor, wherein when the program is executed by the processor, the following steps are implemented:
receiving configuration information of a trigger condition and configuration information of a trigger event that are sent by a network-side device, wherein an association relationship exists between the configuration information of the trigger condition and the configuration information of the trigger event, and configuration information of one trigger condition is associated with pieces of configuration information of at least two trigger events;
determining, based on the pieces of configuration information of the at least two trigger events associated with the configuration information of the trigger condition, whether the trigger condition is satisfied; and
when the trigger condition is satisfied, initiating a radio resource control RRC procedure for cell management;
wherein the receiving the configuration information of the trigger condition and the configuration information of the trigger event that are sent by the network-side device comprises:
receiving the configuration information of the trigger condition and the configuration information of the trigger event, which are sent by a source node after the source node associates the configuration information of the trigger condition with the configuration information of the trigger event in a case that the source node receives configuration information of a target cell of one or more target nodes.

14. The terminal device according to claim 13, wherein
the configuration information of the trigger condition is stored in a trigger condition information list, the configuration information of the trigger event is stored in a trigger event information list, and the association relationship is stored in an association relationship list; or
the configuration information of the trigger condition and the configuration information of the trigger event are stored in a trigger condition configuration information list, wherein each entry in the trigger condition configuration information list comprises configuration information of a trigger condition and configuration information of at least two trigger events corresponding to the configuration information of the trigger condition.

15. The terminal device according to claim 14, wherein
each entry in the trigger condition information list comprises configuration information of a trigger condition and identification information corresponding to the configuration information of the trigger condition;
each entry in the trigger event information list comprises configuration information of a trigger event and identification information corresponding to the configuration information of the trigger event; and
the association relationship comprises:
an association relationship between identification information corresponding to configuration information of a trigger condition and an entry tag of the trigger event information list; or
an association relationship between an entry tag of the trigger condition information list and identification information corresponding to configuration information of a trigger event; or
an association relationship between an entry tag of the trigger condition information list and an entry tag of the trigger event information list; or
an association relationship between identification information corresponding to configuration information of a trigger condition and identification information in the trigger event information list; or
an association relationship between an entry tag of the trigger condition information list and identification information in the trigger event information list.

16. The terminal device according to claim 15, wherein the association relationship between the identification information corresponding to the configuration information of the trigger condition and the identification information in the trigger event information list comprises:
an association relationship between the identification information corresponding to the configuration information of the trigger condition and identification information corresponding to configuration information of a trigger event;
wherein the identification information corresponding to the configuration information of the trigger event comprises at least one of: measurement identification (MeasID), target terminal identification, or event identification.

17. The terminal device according to claim 13, the configuration information of the trigger event comprises at least one of the following: a type of the trigger event, a measurement parameter of the trigger event, a threshold of the trigger event, a trigger type, or trigger duration.

18. The terminal device according to claim 17, wherein the type of the trigger event comprises at least one of the following:
a first trigger event based on a measurement result of a target cell;
a second trigger event based on a measurement result of a serving cell;
a third trigger event based on a measurement result of a target cell and a measurement result of a serving cell;
a fourth trigger event based on a packet loss rate in data transmission of a serving cell; or
a fifth trigger event based on a latency in data transmission of a serving cell.

19. The terminal device according to claim 13, wherein the configuration information of the trigger condition comprises effective duration of the trigger condition; or,
wherein the determining, based on the pieces of configuration information of the at least two trigger events associated with the configuration information of the trigger condition, whether the trigger condition is satisfied comprises:

when configuration information of any trigger event in the pieces of configuration information of the at least two trigger events associated with the configuration information of the trigger condition is satisfied, determining that the trigger condition is satisfied; or when configuration information of N trigger events in the pieces of configuration information of the at least two trigger events associated with the configuration information of the trigger condition is satisfied, determining that the trigger condition is satisfied, wherein N is an integer greater than 1; or when configuration information of all trigger events in the pieces of configuration information of the at least two trigger events associated with the configuration information of the trigger condition is satisfied, determining that the trigger condition is satisfied; or, wherein the pieces of configuration information of the at least two trigger events comprise a same first parameter, the first parameter being a type of trigger event; the pieces of configuration information of the at least two trigger events comprise different second parameters, the second parameter being at least one of the following: a measurement parameter of trigger event, a threshold of trigger event, a trigger type, or trigger duration; or, wherein the configuration information of the trigger condition comprises effective duration of the trigger condition, and the effective duration of the trigger condition is used to indicate that the trigger condition is effective in the effective duration and is not effective beyond the effective duration.

20. The terminal device according to claim 13, wherein the source node and the target node are a source base station and a target base station respectively in a cell handover procedure; or, the source node and the target node are a source secondary node and a target secondary node respectively in a dual connectivity architecture; or, wherein the cell management comprises: cell handover in conditional handover; or, secondary node addition, change, release, or modification triggered by a master node in a dual connectivity architecture; or, secondary node addition, change, release, or modification triggered by a secondary node in a dual connectivity architecture.

* * * * *